(12) United States Patent
Camulli

(10) Patent No.: US 9,998,600 B2
(45) Date of Patent: Jun. 12, 2018

(54) MANAGING, DIRECTING, AND QUEUING COMMUNICATION EVENTS USING NEAR-FIELD COMMUNICATIONS

(71) Applicant: Virtual Hold Technology, LLC, Akron, OH (US)

(72) Inventor: Eric I. Camulli, Copley, OH (US)

(73) Assignee: Virtual Hold Technology, LLC, Akron, OH (US)

( * ) Notice: Subject to any disclaimer, the term of this patent is extended or adjusted under 35 U.S.C. 154(b) by 0 days. days.

(21) Appl. No.: 15/366,663

(22) Filed: Dec. 1, 2016

(65) Prior Publication Data

US 2017/0085715 A1    Mar. 23, 2017

Related U.S. Application Data

(62) Division of application No. 13/656,305, filed on Oct. 19, 2012, now Pat. No. 9,516,168.

(51) Int. Cl.
*H04B 5/00*    (2006.01)
*H04M 3/523*   (2006.01)
*H04M 1/2745*  (2006.01)
*H04M 1/725*   (2006.01)

(52) U.S. Cl.
CPC ....... *H04M 3/5231* (2013.01); *H04M 3/5238* (2013.01); *H04M 1/274516* (2013.01); *H04M 1/72547* (2013.01); *H04M 2250/04* (2013.01); *H04W 4/80* (2018.02)

(58) Field of Classification Search
CPC ............. H04M 3/5231; H04M 3/5238; H04M 2250/04

USPC ................................................ 455/41.1, 41.2
See application file for complete search history.

(56) References Cited

U.S. PATENT DOCUMENTS

| | | | |
|---|---|---|---|
| 5,627,884 A | 5/1997 | Williams et al. |
| 5,692,033 A | 11/1997 | Farris |
| 6,064,730 A | 5/2000 | Ginsberg |
| 6,192,050 B1 | 2/2001 | Stovall |

(Continued)

FOREIGN PATENT DOCUMENTS

| EP | 587950 | 3/1994 |
|---|---|---|
| KR | 10-2003-0056994 | 7/2003 |

(Continued)

OTHER PUBLICATIONS

U.S. Appl. No. 15/210,720, filed Apr. 6, 2017 PTO Office Action.

(Continued)

*Primary Examiner* — Raj Chakraborty
(74) *Attorney, Agent, or Firm* — Aldo Noto; Davidson Berquist Jackson & Gowdey, LLP

(57) ABSTRACT

Embodiments of a system and method are disclosed for initiating a call-back sequence using NFC technology. Embodiments include capturing an image using an NFC reader determining an identification of active queues, displaying an indication of the active queues on a display screen using a session queuing component, obtaining user selection of a queue as a selected queue using the session queuing component, sending a request to a communication system in a data format for an expected wait time associated with the selected queue, receiving the expected wait time from the communication system, and sending a confirmation to the communication system in a data format for a callback.

19 Claims, 15 Drawing Sheets

(56) References Cited

U.S. PATENT DOCUMENTS

| | | |
|---|---|---|
| 6,405,049 B2 | 6/2002 | Herrod et al. |
| 6,535,601 B1 | 3/2003 | Flockhart et al. |
| 6,563,921 B1 | 5/2003 | Williams et al. |
| 6,879,683 B1 | 4/2005 | Fain et al. |
| 7,068,775 B1 | 6/2006 | Lee |
| 7,426,267 B1 | 9/2008 | Caseau |
| 7,746,999 B2 | 6/2010 | Williams et al. |
| 7,787,610 B2 | 8/2010 | Williams et al. |
| 8,010,706 B1 | 8/2011 | Rein et al. |
| 8,112,069 B2 | 2/2012 | Williams et al. |
| 8,150,023 B2 | 4/2012 | Williams et al. |
| 8,213,911 B2 | 7/2012 | Williams et al. |
| 8,223,956 B2 | 7/2012 | Williams et al. |
| 8,229,101 B1 | 7/2012 | Williams |
| 8,256,922 B2 | 9/2012 | Futami |
| 8,589,673 B2 | 11/2013 | Ackerly |
| 9,082,143 B1 | 7/2015 | Cleary |
| 9,386,155 B2 | 7/2016 | Williams |
| 2002/0007295 A1 | 1/2002 | Kenny et al. |
| 2002/0065759 A1 | 5/2002 | Boies |
| 2002/0193119 A1 | 12/2002 | Goss et al. |
| 2003/0012558 A1 | 1/2003 | Kim et al. |
| 2003/0061078 A1 | 3/2003 | Shimosako et al. |
| 2003/0093167 A1 | 5/2003 | Sim |
| 2003/0133558 A1 | 7/2003 | Kung et al. |
| 2003/0195753 A1 | 10/2003 | Homuth |
| 2003/0235287 A1 | 10/2003 | Margolis |
| 2004/0097287 A1 | 5/2004 | Postrel |
| 2004/0196856 A1 | 10/2004 | Bondarenko et al. |
| 2005/0018849 A1 | 1/2005 | Rodriguez et al. |
| 2005/0093986 A1 | 5/2005 | Shinohara et al. |
| 2005/0175167 A1 | 8/2005 | Yacoub et al. |
| 2005/0233733 A1 | 10/2005 | Roundtree |
| 2006/0012810 A1 | 1/2006 | Postle et al. |
| 2006/0111941 A1 | 5/2006 | Blom |
| 2006/0143058 A1 | 6/2006 | Brunet |
| 2006/0182243 A1 | 8/2006 | Yun |
| 2006/0277550 A1 | 10/2006 | Williams et al. |
| 2006/0258397 A1 | 11/2006 | Kaplan et al. |
| 2006/0265286 A1 | 11/2006 | Evangelist et al. |
| 2007/0086585 A1 | 4/2007 | Dorricott |
| 2007/0116230 A1 | 5/2007 | Brandt et al. |
| 2007/0160076 A1 | 7/2007 | Faber et al. |
| 2007/0274495 A1 | 11/2007 | Youd |
| 2008/0063180 A1 | 3/2008 | Barsness et al. |
| 2008/0144827 A1 | 6/2008 | Davis |
| 2008/0195456 A1 | 8/2008 | Fitzpatrick et al. |
| 2008/0238610 A1 | 10/2008 | Rosenberg |
| 2008/0317058 A1 | 10/2008 | Williams |
| 2009/0074166 A1 | 3/2009 | Pavlic et al. |
| 2009/0119599 A1 | 5/2009 | Hazen |
| 2010/0008265 A1 | 1/2010 | Freer |
| 2010/0189250 A1 | 7/2010 | Williams et al. |
| 2010/0190476 A1 | 7/2010 | Williams et al. |
| 2010/0190477 A1* | 7/2010 | Williams ............... G06Q 10/02 455/414.1 |
| 2011/0184646 A1 | 7/2011 | Wong et al. |
| 2011/0313923 A1 | 10/2011 | Votaw et al. |
| 2011/0288962 A1 | 11/2011 | Rankin et al. |
| 2011/0320293 A1* | 12/2011 | Khan ............... G06Q 20/0457 705/16 |
| 2012/0085829 A1 | 4/2012 | Ziegler |
| 2012/0150565 A1 | 6/2012 | Gordon et al. |
| 2012/0170728 A1 | 7/2012 | Wengrovitz et al. |
| 2012/0196578 A1 | 8/2012 | Williams et al. |
| 2012/0288075 A1 | 11/2012 | Williams et al. |
| 2012/0295596 A1 | 11/2012 | Camulli et al. |
| 2013/0041775 A1* | 2/2013 | Rosenberg ............. G06Q 30/02 705/26.9 |
| 2013/0053002 A1 | 2/2013 | Hymes |

FOREIGN PATENT DOCUMENTS

| | | |
|---|---|---|
| KR | 10-2004-0104097 | 12/2004 |
| KR | 10-0612440 | 8/2006 |
| KR | 10-0765967 | 10/2007 |
| WO | WO2000-44159 | 7/2000 |
| WO | WO2004-081720 | 9/2004 |
| WO | WO2010-087697 | 8/2010 |
| WO | WO2010-087966 | 8/2010 |

OTHER PUBLICATIONS

CA Appln. No. 2,750,942—Office Action dated Feb. 4, 2016.
CA Appln. No. 2,750,942—Office Action dated Nov. 22, 2016.
EP Appln. No. 10736139.6—Office Action dated Jun. 28, 2012.
EP Appln. No. 10736140.4—Office Action dated Jul. 12, 2016.
EP Appln. No. 10736140.4—Office Action dated Jun. 28, 2012.
International Search Report dated Oct. 12, 2010, in related foreign application under the WIPO, Application No. PCT/US2010/000239.
International Search Report dated Sep. 18, 2010, in related foreign application under the WIPO, Application No. PCT/US2010/000238.
U.S. Appl. No. 13/619,629, filed Sep. 7, 2016 PTO Office Action.
U.S. Appl. No. 15/199,945, filed Dec. 30, 2016 PTO Office Action.
UK Appln. No. 1306668.3—Search Report and Examination Opinion dated Jul. 24, 2013.

* cited by examiner

110 — MEDIA LAYER PROTOCOLS

108 — TCP/IP & HTTP
SOURCE IP ADDRESS & PORT
DESTINATION ADDRESS & PORT

100 — [ PROTOCOL INFORMATION 102
<RPC ID> ACTIVE PROVIDER METHOD </RPC ID> 104
<USER ID> JOHN DOE </USER ID> 106 ]

110 — MEDIA LAYER PROTOCOLS

108 — TCP/IP & HTTP
SOURCE IP ADDRESS & PORT
DESTINATION ADDRESS & PORT

118 — [ PROTOCOL INFORMATION 120
<RPC ID> ACTIVE QUEUES </RPC ID> 122
<SELECTED PROVIDER> JOHN DOE </SELECTED PROVIDER> 124 ]

110 — MEDIA LAYER PROTOCOLS

108 — TCP/IP & HTTP
SOURCE IP ADDRESS & PORT
DESTINATION ADDRESS & PORT

138 — [ PROTOCOL INFORMATION 140
<RPC ID> EWT </RPC ID> 142
<SELECTED PROVIDER> COMPANY A </SELECTED PROVIDER>
<SELECTED QUEUE> QUEUE ID </SELECTED PROVIDER> ] 144

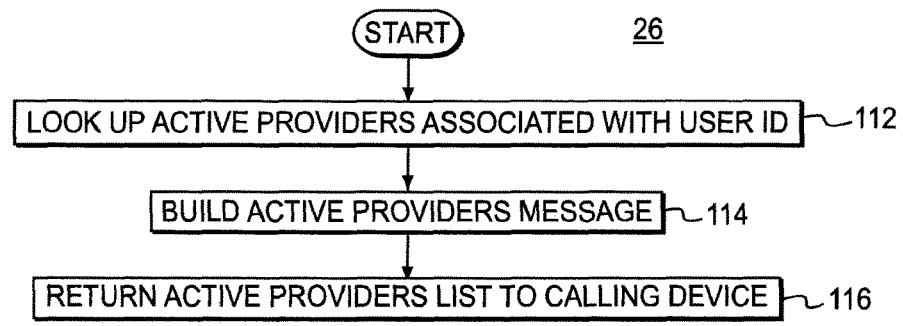
FIG. 8A
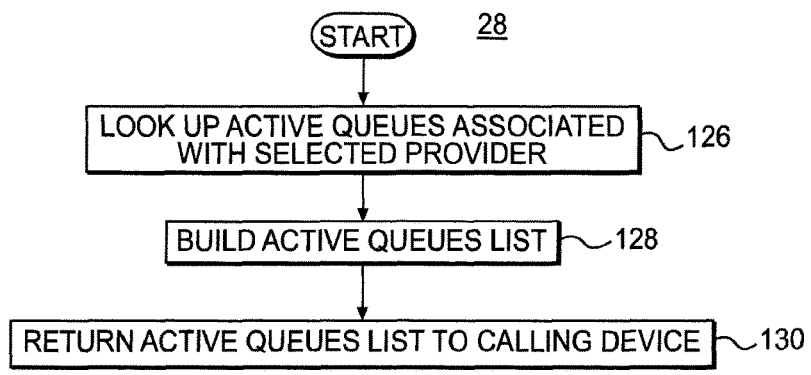
FIG. 8B
FIG. 8C

| COMPANY ID 212 | ACTIVE QUEUES 214 |
|---|---|
| COMPANY A | SERVICE OUTAGE, NEW SERVICE, BILLING, OTHER |
| COMPANY B | CHECKING/SAVING, CREDIT CARD, MORTGAGES, OTHER |
| COMPANY C | NEW RESERVATION, EXISTING RESERVATION, ACCOUNT, OTHER |
| COMPANY D | SERVICE A, SERVICE, B, SERVICE C, OTHER |
*FIG. 8D*
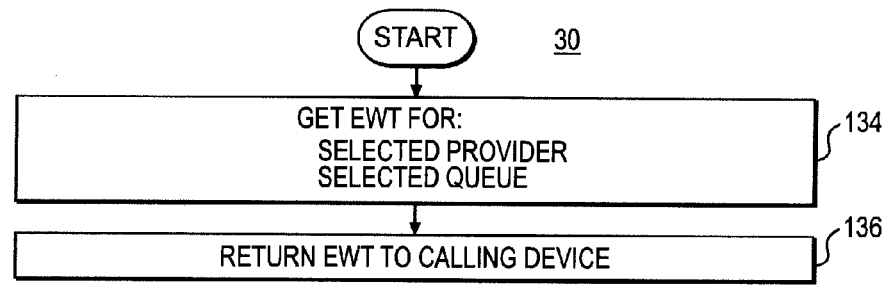
*FIG. 8E*
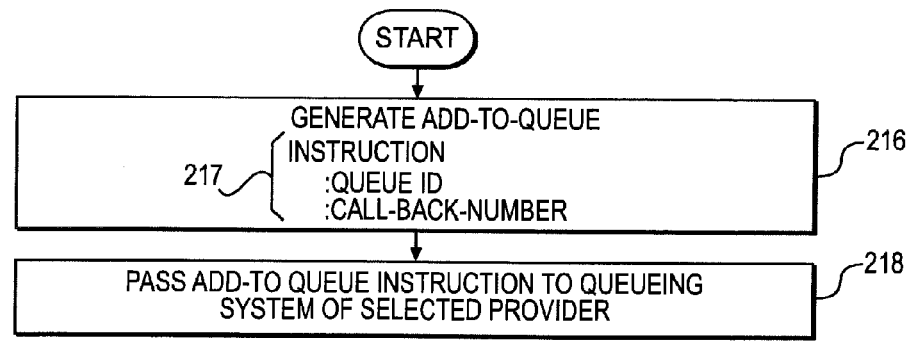
*FIG. 8F*

US 9,998,600 B2

MANAGING, DIRECTING, AND QUEUING COMMUNICATION EVENTS USING NEAR-FIELD COMMUNICATIONS

TECHNICAL FIELD

The systems and methods relate to managing the queuing of clients waiting to be connected by telephone to a service agent of a business communication center. More particularly, the systems and methods relate to enabling clients to be added to a queue utilizing web service messaging and relate to establishing a telephony connection between clients and service agents on an automated basis and in an order maintained by a queue.

BACKGROUND

Many businesses use groups of service representatives for communicating with clients who initiate communications with the business, such as by telephone calls. To most efficiently use the time and skills of each service representative, the service representatives may be organized into groups based on a skill set. For example, the groupings may be based on the representative's ability to handle client issues such as the opening of new accounts, billing issues and customer service issues on existing accounts.

Typically, if a client calls such a business, voice prompt menu choices enable the calling client to identify the issue for which the client requires service and the client is then queued for a service agent capable of handling the identified issue. As such, it is expected that clients who identify the purpose of their call as a "billing issue" will be queued for, and connected to, a service representative with the ability to handle billing issues. Similarly, it is expected that clients who identify the purpose of their call as a "customer service issue" will be queued for, and connected to, a service representative with the ability to handle customer service issues.

There are problems with existing communications systems, such as contact centers, including the following two problems. First, the voice prompt menus that are used to channel callers to the queue for the appropriate group of service agents are exasperating to a client at best. It takes significant time to navigate the layered menus of voice prompts.

Second, waiting on-hold while the telephone connection is maintained in queue for connection to a service agent is also exacerbating to a client at best.

In an effort to reduce customer exacerbation caused by having to maintain a connection while on-hold in queue, secondary queue systems have been developed. A typical secondary queue system obtains a telephone number at which the calling client can be reached when a service representative is available (i.e., a call back number). The client disconnects, and then, at the proper time, a call back system establishes a connection to the client utilizing the call back number and couples the client to an available representative without waiting on-hold in queue. One exemplary system is disclosed in U.S. Pat. No. 6,563,921 to Williams et al. which is commonly assigned with the present application.

While such a system may make the experience of waiting for a connection to a service representative slightly less frustrating, it does not address the inconvenience of having to navigate an irritatingly slow and usually complicated voice prompt menu to enter the queue.

SUMMARY

Embodiments of the present disclosure include an apparatus for initiating a voice call-back sequence using near-field communication (NFC) technology. The apparatus includes an NFC reader that captures information from an NFC tag, and a processor configured to execute a device application. The device application includes a routine that captures information from the NFC tag. The device application further includes a routine, such as a session queuing component, that causes an indication of the one or more active queues to be displayed on a display screen of the apparatus and obtains a selection of a queue as a selected queue. The session queuing component resides within the apparatus. In some embodiments, the device application determines an identification of the one or more active queues to be displayed, based at least in part on the information captured from the NFC tag. The device application further includes a routine that sends a message in a data format to a communication system, the message being related to a voice connection. In some embodiments, the message comprises one of a call-back confirmation, a direct connection request, a scheduled call-back request, and a cancellation.

Embodiments of the present disclosure also include a method for initiating a call-back sequence using NFC technology. The method includes capturing information from an NFC tag, displaying an indication of the one or more active queues on a display screen of a communication device using a session queuing component that resides within the device. In some embodiments, the method includes determining an identification of one or more active queues, based at least in part on the information captured from the NFC tag. The method further includes obtaining a selection of a queue as a selected queue using the session queuing component, and sending a message in a data format to a communication system, the message being related to a voice connection. In some embodiments, the message comprises one of a call-back confirmation, a direct connection request, a scheduled call-back request, and a cancellation.

Embodiments also include a non-transitory, computer-readable medium comprising computer-executable instructions for initiating a call-back sequence using NFC technology. The computer-executable instructions include instructions for capturing information using an NFC reader, displaying an indication of one or more active queues on a display screen of a communication device using a session queuing component that resides within the device, obtaining a selection of a queue as a selected queue using the session queuing component, and sending a message to a communication system in a data format, the message being related to a voice connection. In some embodiments, the message comprises one of a call-back confirmation, a direct connection request, a scheduled call-back request, and a cancellation. In some embodiments, the computer-executable instructions further comprise instructions for determining identification of the one or more active queues based at least in part on the information captured from the NFC tag.

One of the embodiments of the present disclosure is a communication device comprising an NFC reader. The device may be a cell phone, a smartphone, a tablet or laptop computer, or the like. The device also includes a processor and a memory comprising application software executable by the processor, including an application for reading information from an NFC tag and initiating various types of voice communication. When executed, the application retrieves information from the NFC tag, uses the retrieved information to display a plurality of voice communication options, including a voice call-back. In some embodiments, the application may also request, receive, and display wait information for the voice call-back, along with one or more additional options such as confirm the voice call-back, cancel the voice call-back, schedule a voice call-back, or establish an immediate connection. In some embodiments, the wait information may comprise the expected wait time. In some embodiments, the wait information may comprise the number of callers currently waiting. In some embodiments, the additional options displayed depend on the expected wait time or the number of callers waiting. The application sends a message based on a received selection from among the displayed options.

BRIEF DESCRIPTION OF THE DRAWINGS

FIGS. 7A through 7D are exemplary messaging structures packaged with transport layer and media layer information;

FIG. 8A is a flow chart representing exemplary operation of an active providers service or method in accordance with an exemplary embodiment of the present disclosure;

FIG. 8B is an exemplary active providers data storage in accordance with an exemplary embodiment of the present disclosure;

FIG. 8C is a flow chart representing exemplary operation of an active queues service or method in accordance with an exemplary embodiment of the present disclosure;

FIG. 8D shows an exemplary active queues data storage according to embodiments of the present disclosure;

FIG. 8E is a flow chart representing exemplary operation of an expected wait time service or method in accordance with an exemplary embodiment of the present disclosure;

FIG. 8F is a flow chart representing exemplary operation of an add-to-queue method in accordance with an exemplary embodiment of the present disclosure;

DETAILED DESCRIPTION

Figure 1:
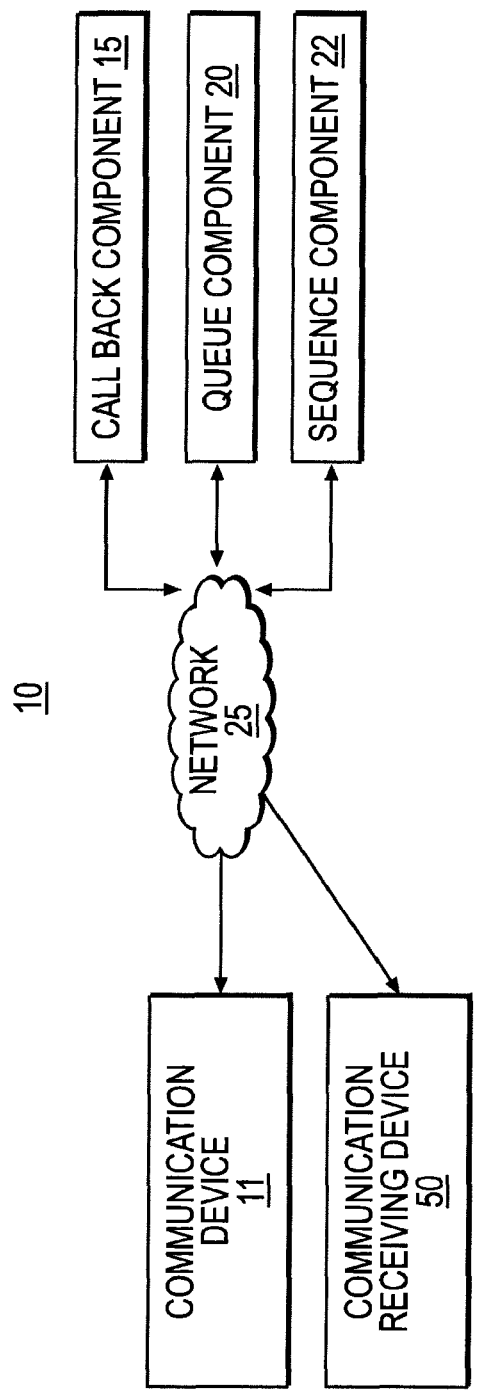
FIG. 1 is a block diagram representing an exemplary architecture of a system for sequencing communication devices in a selected queue of a selected provider.

Embodiments of the present disclosure will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code which is encoded within computer readable media accessible to the processor, or a combination of a hardware circuit(s) and a processor or control block of an integrated circuit executing machine readable code encoded within a computer readable media. As such, the term circuit, module, server, or other equivalent description of an element as used throughout this specification is intended to encompass a hardware circuit (whether discrete elements or an integrated circuit block), a processor or control block executing code encoded in a computer readable media, or a combination of a hardware circuit(s) and a processor and/or control block executing such code.

It should also be appreciated that the table structures represented in this application are exemplary only and intended to show the mapping of relationships between various data elements. Other table structures may store similar data elements in various manners. Further, the applicant's use of the term "plurality" is intended to indicate not just "at least one", but one, two, three, or any other quantity. The applicant's use of the term "group" is intended to indicate not just "at least one", but two, three, or more of the items within the group.

FIG. 1 is a high level schematic illustration of a system 10 for placing a communication device 11 in a queue and calling a communication receiving device 50. The system 10 includes the communication device 11, a network 25, a call back component 15, a queue component 20, a sequence component 22, and the communication receiving device 50.

The system 10 assigns a placeholder for a communication device 11 (or an identifier for a communication device 11 such as its telephone number or other unique network identifier) in a selected queue (not shown in FIG. 1) of the queue component 20. The system uses a sequence component 22 to execute a call back sequence to a communication receiving device 50. When prompted, the call back component 15 places an outgoing call to a communication receiving device 50. The outgoing call attempts to establish a voice connection with the communication receiving device 50.

The communication receiving device 50 may be any device that can receive a telephone call. In some embodiments, the communication receiving device 50 may be the communication device 11 that sent the initial data requesting a telephone connection. When used herein to describe the target device for receiving a call-back communication, the term "communication device" (or "communication device 11") shall include either the device used for making the initial request or another device that is capable of receiving the call-back communication, such as a telephone call.

In some embodiments, prior to allowing communication between a communication device 11 and the system 10, the system 10 performs one or more security checks. These security checks can be performed for a variety of purposes including ensuring that the software on the communication device 11 is authentic and valid for use on the device and that the device is authorized. Various software routines may be used by the system 10 and the communication device 11 to perform security checks. Encryption keys may be assigned to the communication devices 11 and used for the security check.

In an embodiment, the identifier for a communication device 11 is an encryption key. Each software application for communicating with the system 10 on a communication device 11 may have one or more unique encryption keys that are recognized by the system 10.

The network 25 (depicted by a cloud) can be any one or more of a variety of networks. The system 10 shown can support many communication devices 11 of various types and many queues (not shown in FIG. 1). The communication device 11 may communicate with the other components through the network using available techniques.

The communication device 11 may be a mobile communication device, such as a cellular telephone. The communication device 11 may also be a non-mobile device, such as a home entertainment device, a kiosk, or a point of purchase device.

Figure 2:
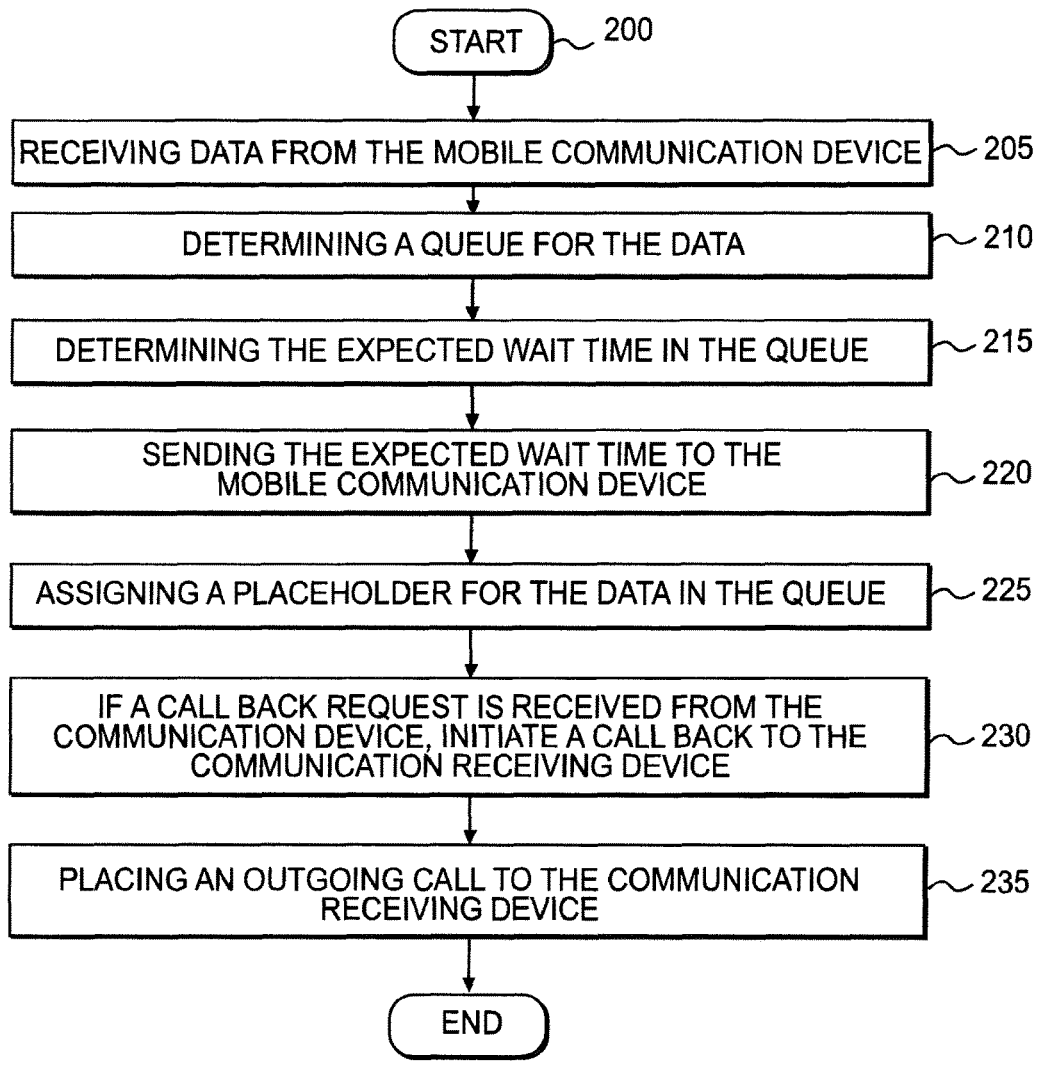
FIG. 2 is a flow-chart of a method for call back sequencing.

Referring now to FIG. 2, shown is a flow chart of an exemplary embodiment of a method for initiating a call-back sequence in a communication system, such as a call center or contact center, for example. The method 200 includes receiving data from a communication device 11 (205), determining a queue for the data (210), determining the expected wait time in the queue (215) for the data and sending the expected wait time in the queue to a communication device 11 (220). The method further includes assigning a placeholder for the data in the queue (225). If a call back request is received from the communication device 11, the method includes initiating a call back to a communication receiving device 50. The method further includes placing an outgoing call to a communication receiving device 50 (235). The steps of the method may be performed in various different orders or chronology. In some embodiments, blocks 215 and 220 may comprise determining the number of clients currently waiting in the queue and sending the number of waiting clients, respectively, instead of or in addition to the expected wait time in the queue.

As noted above, the communication receiving device 50 may be any device that can receive a telephone call. The communication receiving device 50 may be the communication device 11 that sent the initial data requesting a telephone connection, or a different communication device.

Figure 3A:
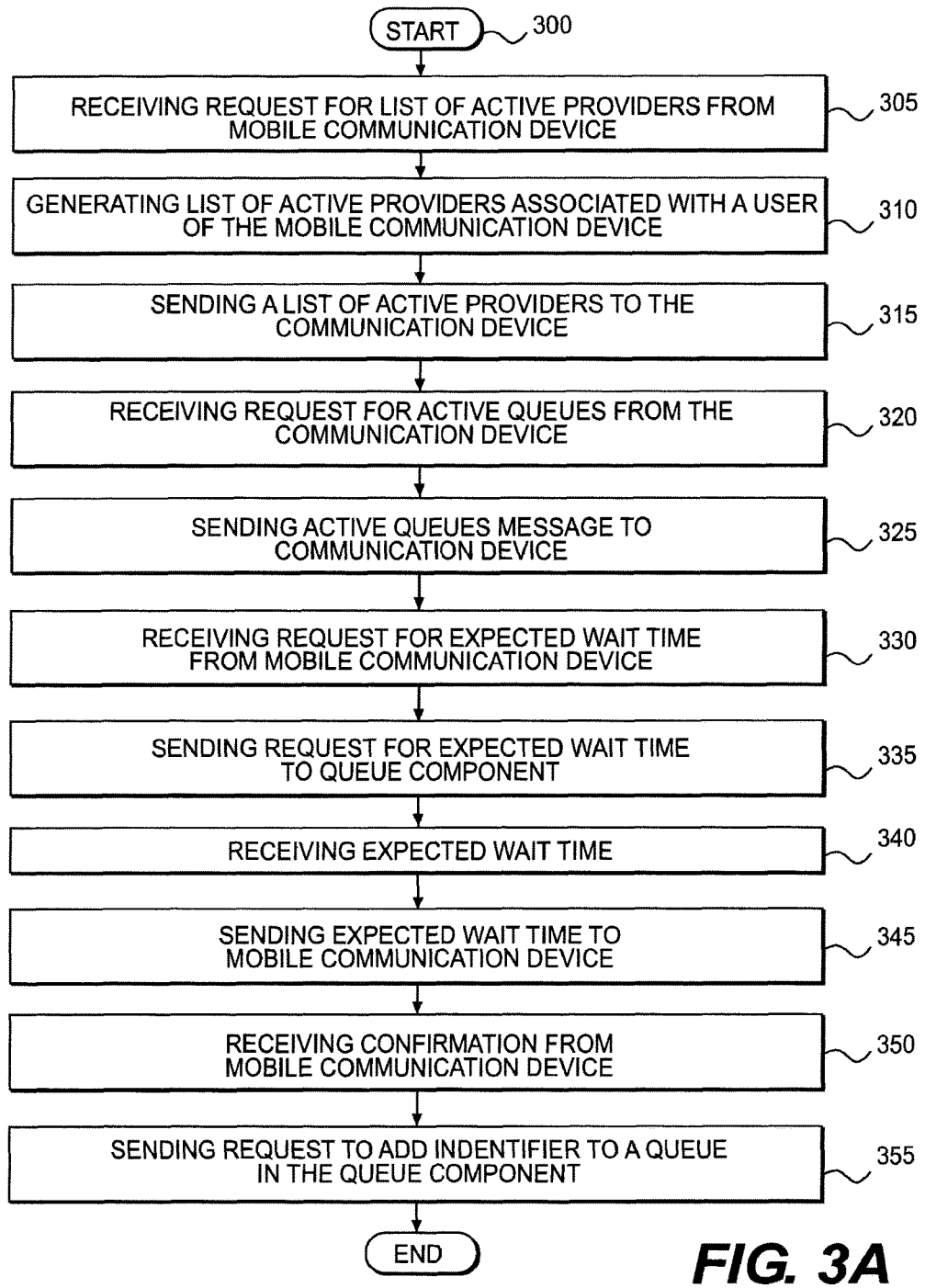
FIG. 3A is a flow-chart of a method for assigning a placeholder in a queue for a call back to a communication device.

FIG. 3A is a flow chart of an embodiment of a method 300 for assigning a placeholder in a queue for a call back to a communication device 11 in a communication system. The description of the method 300 in FIG. 3A also references components and routines found in FIG. 3B. The method 300 of FIG. 3A includes the sequence component 22 receiving a request for a list of active providers from a communication device 11. This may be in the form of an active provider remote processing call 48 from a provider client routine 34 (305). The provider client 34 is a routine which is part of the session queuing component 24. The active provider remote processing call 48 originates from the communication device 11 and serves as the request for a list of active providers. The active providers may be associated with a user of the communication device 11. Upon receipt of the active provider remote processing call 48, the sequence component 22 launches an active provider routine 26. The routine generates a list of active providers associated with the user (310) of the communication device 11.

The method 300 further includes active provider routine 26 sending a list of active providers to the communication device 11 via an active providers message 50. More particularly, the provider client routine 34 in the session queuing component 24 receives active providers message 50 (315).

The method 300 further includes receiving a request for active queues in the queue component 20 via an active queue remote processing call 52 from the communication device 11 (320). The active queue remote processing call 52 serves as a request for a listing of active queues associated with the selected provider to an active queue routine or process 28 of the sequence component 22. The listing is populated into the service control 40 of the session queuing component 24.

The exemplary method 300 of FIG. 3A further includes sending active queues, via an active queues message 54, from active queue routine 28 to service client routine 38. The service client routine 38 in this example is resident on the communication device 11 (325). The active queues message 54 includes active queues wherein an identifier of a communication device 11 or other communication receiving device may be placed.

The method 300 further includes receiving a request for the expected wait time for receiving a call back from a provider. The expected wait time may be received via an expected wait time call 56 from the communication device 11 (330). Upon the user selecting a queue using the service control 40, the expected wait time client 42 generates an expected wait time call 56 to the sequence component 22. The method 300 includes the expected wait time routine 30 sending a request 62 for the expected wait time to the expected wait time component 18 (within the queue component 20) (335) and receiving the expected wait time 64 (340) from the expected wait time component 18. In some embodiments, request 62 may comprise a request for the number of clients currently waiting in the queue. In some embodiments, expected wait time 64 may comprise the number of clients waiting in the queue.

With continuing reference to FIG. 3A, the method 300 further includes sending an expected wait time message 58 to the communication device 11 (345). More particularly, the expected wait time message 58 is sent from the expected wait time routine 30, of the sequence component 22, to an expected wait time client 42 of the session queuing component 24. In some embodiments, expected wait time message 58 may comprise the number of clients currently waiting in the queue. The method 300 further includes receiving a confirmation call 60 from the communication device 11. More particularly, the confirmation call originates from confirmation client 46 (part of the session queuing component 24) and is sent to the confirmation routine 32 (350) of the sequence component 22. The method 300 further includes sending a request via a message 66 to the queue component 20 to add user's identifier to the selected queue (355).

Figure 3B:
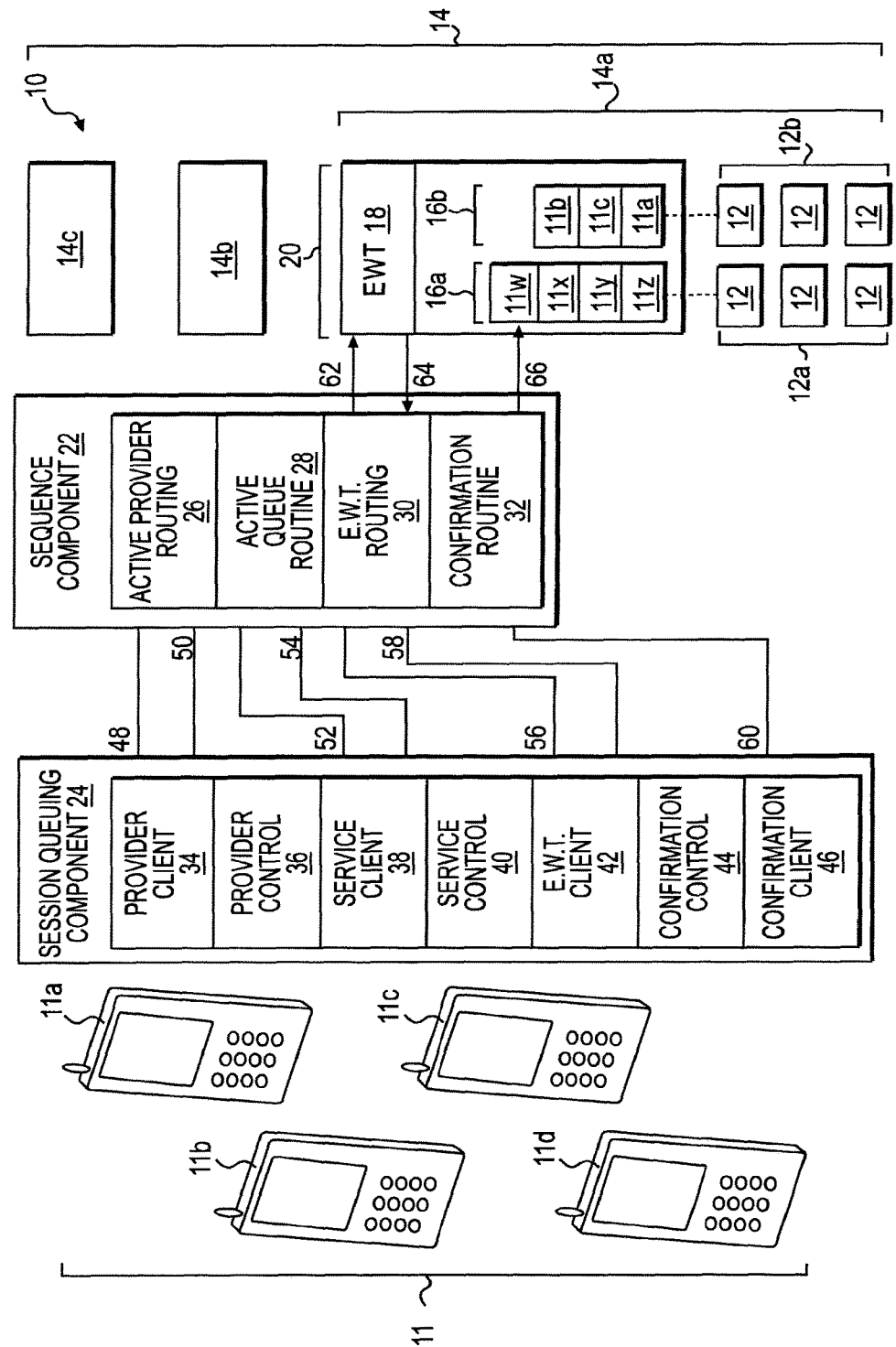
FIG. 3B is a block diagram representing an exemplary architecture of a system for sequencing communication devices in a selected queue of a selected provider.

FIG. 3B is a schematic diagram of an embodiment of a telephone based system 10 showing multiple communication devices 11a-11d and multiple business communication centers 14a-14c. Each business communication center 14a-14c is typically associated with a company for which the business communication center 14a-14c is operated. The system 10 includes sequence component 22 and a session queuing component 24. The sequence component 22 performs the call back sequencing of the communication devices 11a-11d. The session queuing component 24 resides within a communication device 11 and can be loaded onto each communication device 11a-11d.

With continuing reference to FIG. 3B, each business communication center (using business communication center 14a for reference) may be associated with a company and comprise a group of service agents 12. Each of the service agents 12 may be a service representative system for enabling a service representative to service a client. More specifically, the service representative may participate in an audio or audio/video session with a communication device 11 and service the requests of each client, or routine, of the session queuing component 24. The service agents 12 may be organized in a single service agent set grouped into multiple service agent sets based on the skill set of service agent operators (e.g., the operators of the service agents 12 at a communication system).

In an embodiment, the business communication center 14a has at least one computer system including a processor operating the queue component 20, and memory. In general, the queue component 20 is adapted to maintain a group of queues 16a, 16b with each queue 16a, 16b being associated with one of sets 12a, 12b of the group of service agents 12. For example the set of service agents 12a may be associated with queue 16a while the second set of service agents 12b may be associated with queue 16b.

In an embodiment, the queue component 20 identifies a sequential order of the devices 11w, 11x, 11y, and 11z, which are queued for connection to one of the service agents 12.

In some embodiments, expected wait time component 18 is adapted to determine an expected wait time value representing the time at which service agents 12 within the particular service agent group are expected to be available to service a client. The expected wait time can be calculated or determined in a number of different ways. In some embodiments, expected wait time component 18 may be adapted to determine other information associated with a particular queue, such as the number of clients currently waiting.

The expected wait time value may represent an estimated wait time calculated using primary estimated wait time techniques such as projecting a wait time based on the quantity of clients in the queue and any of a historical, present, or projected time allotment for handling each such queued client. Alternatively, the expected wait time value may be a function of both a primary estimated wait time calculation and a wait time augmentation calculation made based on service agent availability and/or scheduled change in service agent availability as disclosed in co-pending patent application Ser. No. 11/143,857 filed on Jun. 2, 2005 and assigned to the same assignee as the present application. Such patent application is incorporated herein by reference.

The sequence component 22 may be embodied as a web services server. In one embodiment, the sequence component is connected to the internet and includes appropriate web services messaging systems (i.e., Simple Object Access Protocol or SOAP) for communicating with the session queuing component 24 on the devices 11a-11d. In an embodiment, the sequence component 22 communicates with queue component 20.

The sequence component 22 may include a processor (not shown) for executing the web services messaging systems as well as other applications stored on a memory (not shown). Such other applications may comprise an active provider routine 26, an active queue routine 28, an expected wait time routine 30, and a confirmation routine 32.

The session queuing component 24 may include a number of routines including for example, a provider client 34, a company or provider control 36, a queue or service client 38, a queue or service control 40, an expected wait time client 42, a confirmation control 44 and a confirmation client 46.

It should be appreciated that each of the routines of the session queuing component 24 are exemplary and for illustrative purposes. Those skilled in the art will recognize that the systems and functions of each routine described herein may be implemented by way of other permutations of components and sub systems.

In an embodiment, the session queuing component 24 may be an embedded application of a communication device 11. In another embodiment, the session queuing component may be a java script, ActiveX, or other similar structure downloaded and executed by a browser and an applicable browser plug-in executing on the communication device 11. In this embodiment, the session queuing component 24 may include a combination of the java script or ActiveX control and components of the browser and/or the plug-in, which in combination drive operation of the session queuing component 24.

In an embodiment, the session queuing component 24 communicates with the sequence component 22 using web service messages and well-known Internet protocols, for example, IP, TCP, UDP, HTTP, etc. In an embodiment, the session queuing component 24 obtains user selection of a provider (from a group of providers) with which the user desires to communicate via a telephone communication session. The session queuing component 24 may also obtain user selection of a service of the selected provider (from a group of services) and may present an estimated wait time representing a duration of time the user can be expected to wait until connecting to the selected services. In some embodiments, the session queuing component 24 may present the number of clients currently waiting in a queue. After presenting the expected wait time and/or the number of waiting clients to the user, session queuing component 24 confirms that the user desires to connect to a service agent 12. More specifically, it confirms that the user wishes to speak with a particular type of service agent 12. The session queuing component 24 assists in placing the user in a queue for the user to receive a call back from the service agent 12 at a connection time.

The connection time may be when the user reaches the first position in the queue (i.e., after other clients in the selected queue prior to the client have all been connected to available service agents or abandoned their position in the queue selected) and a service agent becomes available, or at a specific scheduled time. The specific scheduled time may be a time calculated by adding the expected wait time to the time at which the expected wait time was presented to the user. The specific scheduled time may also be a time selected by the user. The expected wait time may be rounded, for example, rounded to the nearest one-, two-, or five-minute interval.

The term "provider" is used interchangeably with the term "business communication center" or the "provider's business communication center" within this application, and the term "queue" is used interchangeably with the term "service" or the "queue for connection to a service agent providing the selected service."

In some embodiments, the session queuing component 24 may perform additional functions. For example, session queuing component 24 may obtain user selection of one of several different connection options including but not limited to being placed in a queue to receive a voice call-back. For example, session queuing component 24 may obtain user selection from among additional options including establishing an immediate connection to a service agent of the selected provider, cancelling the user's request for a voice call-back from the selected provider, and requesting a scheduled call-back from the selected provider at a user-selected date and/or time. Moreover, session queuing component 24 may assist the user with the selected option by, for example, initiating the sending of message(s) to the appropriate entity associated with the selected provider.

Figure 4:
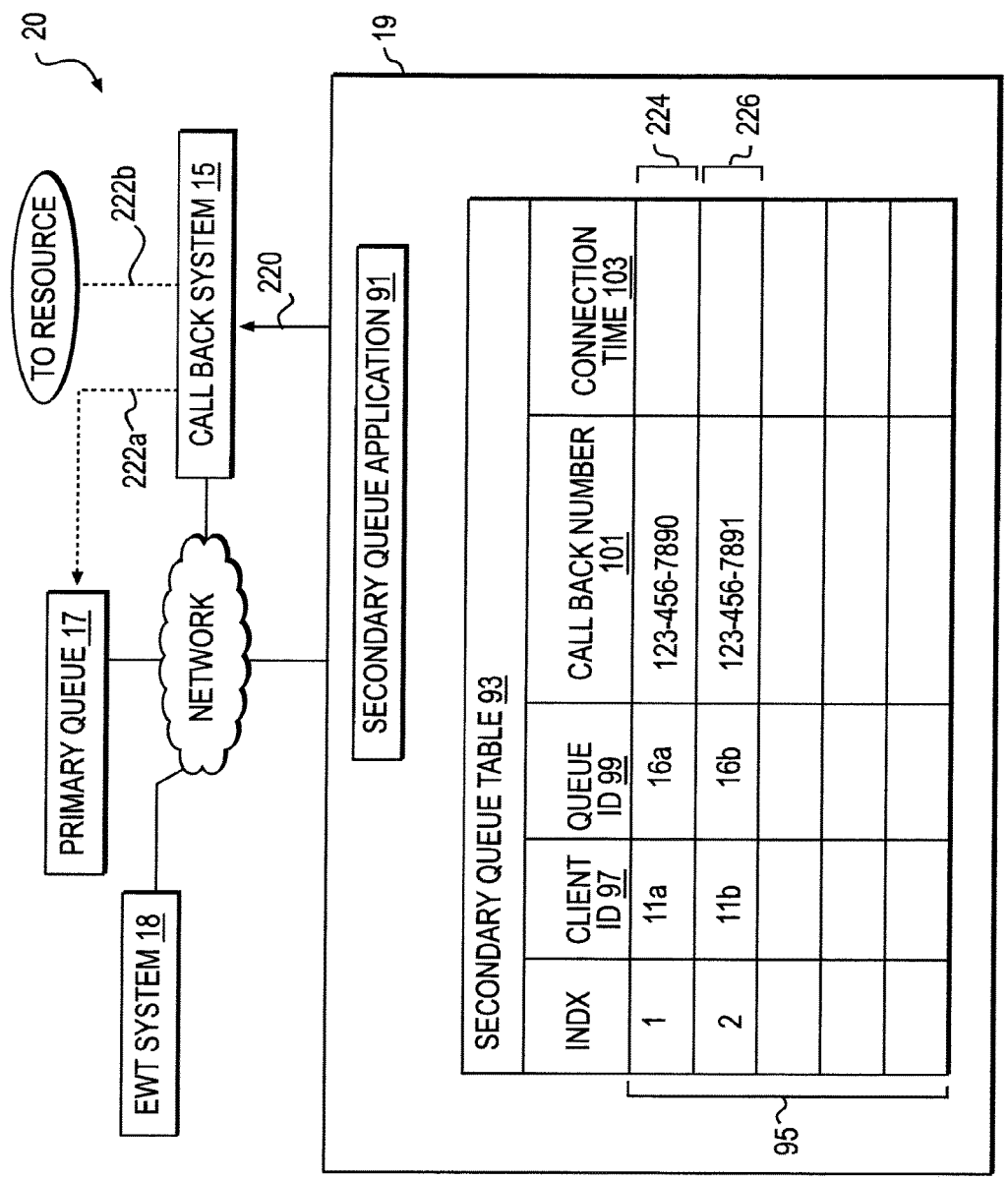
FIG. 4 is a block diagram of an exemplary queue component.

FIG. 4 is a block diagram of an embodiment of queue component 20. The queue component 20 may include primary queue 17 (ACD) adapted to queue communication devices 11 while maintaining the telephony connection (e.g., communication devices "on-hold"), a secondary queue component 19, a call back component 15 adapted to establish a telephony connection to communication device 11 for which a telephony connection is not maintained by the primary queue 17, and an expected wait time component 18.

The primary queue 17 may be embodied in a primary automated call director (ACD). In an embodiment, the ACD places in a queue client telephone connections which are "on-hold" waiting for a service agent 12. Such an ACD may use known technology adapted to (1) receive incoming calls from the communication device 11 (e.g., establishing a client connection with each) (2) identify which group of service agents the caller desires to connect (including using primary voice prompts) and (3) place the call in a queue for connection to the identified service agent group. If one of the service agents 12 within a service agent group becomes available, the ACD connects a next client connection from the queue to the available service agent 12.

The secondary queue component 19 may be coupled to a primary queue 17 as an accessory device. The secondary queue component 19 maintains the queue position of the communication device 11 in a manner that does not require the communication device 11 to remain "on hold" or otherwise maintain an active telephone connection with the primary queue 17. More specifically, for a communication device 11 calling the communication center utilizing the primary queue 17, the secondary queue component 19 may (1) obtain a network address for communication device 11 (e.g., a telephone network call back telephone number or other telephone network address) and (2) write the network address of the telephone connection to a record of the queuing table (for example record 224 in the event a user of communication device 11a calls the communication center in a primary manner). Further, the secondary queue component 19 may, at the appropriate connection time, (3) induce the call back system 15 to establish a connection to the communication device 11 utilizing the call back number. Inducing the call back system 15 to establish the connection may include generating a call back message 220 to the call back system 15.

The secondary queue component 19 may also (e.g., communication devices 11 being added to a queue utilizing telephone system 10), obtain a network address of a telephone connection to the communication device 11 (e.g., a telephone network call back telephone number or other telephone network address) via the messaging discussed above with respect to messages 62, 64, and 66 in FIG. 3B. The secondary queue component 19 may write the network address of the telephone connection to a record of the queuing table (for example record 226 in the event a user of communication device 11b utilizing system 10 for being added to queue 16a), and at the appropriate connection time, induce the call back system 15 to establish a connection to a communication device 11 utilizing the call back number. Inducing the call back system 15 to establish the connection may include generating a call back message 220 to the call back system 15. The call back message 220 may include identification of the telephone number to which the call back system 15 is to establish a telephone connection and identifying the queue 16a, 16b and/or service agent group 12a, 12b to which the telephone connection is to be connected.

After the call back system 15 has established a connection with the communication device 11, it may generate a priority connection to the available service agent 12 within the appropriate service agent group 12a, 12b.

The priority connection 222 may be a transfer 222a of the communication device 11 connection to the primary queue 17. Transfer 222a may occur via a command such that the primary queue 17 connects the client to the next available one of the service agents 12 within the required service agent group 12a-12b (e.g., places the client at the front of the queue). The priority connection 222 may also be a connection 222b directly to the next available service agent 12, bypassing primary queue 17.

The secondary queue system 19 may comprise a secondary queue application 91 and a secondary queue table 93. The secondary queue table 93 maintains, for each communication device 11 being handled by the secondary queue component 19, call back information. In more detail, secondary queue table 93 may comprise a plurality of records 95. Each record 95 associates a client identifier 97 with a call back telephone number 101 (or other network identifier) to which a telephone connection may be established with the subject communication device 11, or other communication receiving device 50 at a connection time 103. Secondary queue table 93 may also include a service agent ID 99 identifying the service agent 120, or subset of the group of service agents to which the client 11 is to be connected.

In one aspect, the secondary queue application 91 monitors the passage of time and, upon determining that time has advanced to the connection time 103 of one of the records 95 of the secondary queue table 93, drives the call back system 15 to establish a telephony connection to the subject client. Again, the telephony connection may be a primary PSTN connection or a telephony connection using an alternative technology such as VoIP.

After establishing the telephony connection, the priority connection to a service agent 12 within the required service agent group is generated.

The expected wait time component 18 may be part of the secondary queue system 19, part of the primary queue (ACD) 17, or a separate accessory system interoperating with the secondary queue system 19 and the primary queue (ACD) 17.

In addition to the communication device 11, a communication receiving device may be used with the system to establish a voice connection.

Figure 5A:
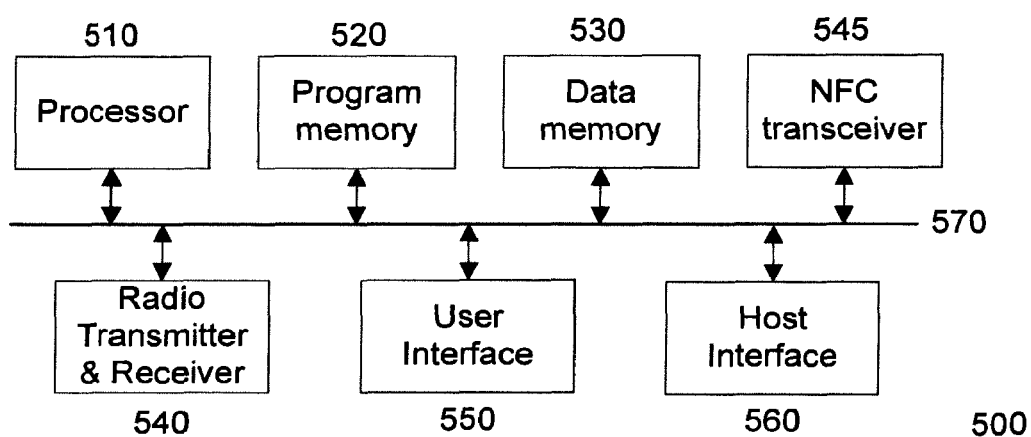
FIG. 5A is a block diagram of an exemplary communication device, according to one or more embodiments of the present disclosure.

FIG. 5A is a block diagram of exemplary display device or apparatus utilizing certain embodiments of the present disclosure, including execution of one or more of the application programs described herein. Device 500 comprises processor 510 that is operably connected to program memory 520 and data memory 530 via bus 570, which may comprise parallel address and data buses, serial ports, or other methods and/or structures known to those of ordinary skill in the art. Program memory 520 comprises software code executed by processor 510 that enables device 500 to communicate using one or more wired or wireless communication protocols, including one or more wireless communication protocols standardized by 3GPP, 3GPP2, or IEEE, such as those commonly known as LTE, UMTS, HSPA, GSM, GPRS, EDGE, CDMA2000 1×RTT and/or 1×EV-DO, 802.11, WiFi, HDMI, USB, Firewire, etc., or any other protocols utilized in conjunction with transceiver 540, user interface 550, and/or host interface 560.

Program memory 520 further comprises software code executed by processor 510 to control the functions of device 500, including configuring and controlling various components such as radio transceiver 540, user interface 550, and/or host interface 560. Program memory 520 may also comprise various application programs that provide portions of the functionality of device 500, as described herein, when executed by processor 510. In some embodiments, program memory 520 may comprise a browser with one or more plug-in modules capable of utilizing Java script, ActiveX, or other downloadable code when executed by processor 510. Program memory 520 may further comprise a protocol stack for data communication with external devices and systems, including IP, TCP, HTTP, RTP, RTSP, and other standardized or proprietary protocols known to persons of ordinary skill in the art. Program memory 520 may further comprise protocols and applications (e.g., a telephone communication application) for signaling, establishing, and maintaining audio communications, e.g., telephone calls, with external devices and systems. The software code comprising program memory 520 may be specified or written using any known or future developed programming language, such as e.g. Java, C++, C, Objective C, HTML, XHTML, and assembler, as long as the desired functionality is preserved.

Data memory 530 may comprise memory area for processor 510 to store variables used in protocols, configuration, control, and other functions of device 500, including the display of one or more of the exemplary screen displays shown and/or described herein. As such, program memory 520 and data memory 530 may comprise non-volatile memory (e.g., flash memory), volatile memory (e.g., static or dynamic RAM), or a combination thereof. Furthermore, data memory 530 may comprise a memory slot by which removable memory cards in one or more formats (e.g., SD Card, Memory Stick, and Compact Flash) may be inserted and removed. Persons of ordinary skill in the art will recognize that processor 510 may comprise multiple individual processors (not shown), each of which implements a portion of the functionality described above. In such case, multiple individual processors may be commonly connected to program memory 520 and data memory 530 or individually connected to multiple individual program memories and or data memories. More generally, persons of ordinary skill in the art will recognize that various protocols and other functions of device 500 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio transceiver 540 may comprise various radio-frequency transmitter and/or receiver functionality—including any necessary antennas—that enables device 500 to communicate with other equipment supporting like wireless communication standards. In some embodiments, radio transceiver 540 may include an LTE transmitter and receiver that enable device 500 to communicate with various Long Term Evolution (LTE) networks (also known as "4G") according to standards promulgated by 3GPP. In some embodiments, radio transceiver 540 includes circuitry, firmware, etc. necessary for device 500 to communicate with various UMTS and/or GSM/EDGE networks, also according to 3GPP standards. In some embodiments, radio transceiver 540 includes circuitry, firmware, etc. necessary for device 500 to communicate with various CDMA2000 networks, according to 3GPP2 standards. In some embodiments, radio transceiver 540 is capable of communicating using radio technologies that operate in unlicensed frequency bands, such as IEEE 802.11 WiFi that operates in the ISM bands in the regions of 2.4 and 5.6 GHz. In some embodiments, radio transceiver 540 may comprise a transceiver that is capable of wired communication, such as by using IEEE 802.3 Ethernet technology. The functionality particular to each of these embodiments may be coupled with or controlled by other circuitry in device 500, such as processor 510 executing protocol program code stored in program memory 520.

Device 500 further comprises an NFC transceiver 545, which comprises an NFC reader and, in some embodiments, an NFC writer that is capable of altering the memory contents of a programmable NFC tag. In some embodiments, NFC transceiver 545 may be removably connected to device 500, e.g., via a port, connector, etc. In some embodiments, NFC transceiver 545 may be communicably coupled to device 500 via a wired or wireless connection, e.g., a short-range wireless connection such as Bluetooth. In such embodiments, bus 570 may comprise additional circuitry necessary for interfacing NFC transceiver 545 with processor 500 and other components of device 500.

Since NFC technology is well-known in the art, only a brief description of this technology is presented here for context. Further information is available, for example, in NFC Data Exchange Format (NDEF) Technical Specification, NFC Record Type Definition (RTD) Technical Specification, NFC Text RTD Technical Specification, NFC URI RTD Technical Specification (all dated Jul. 24, 2006), NFC Type-1 Tag Operation Specification (dated Apr. 13, 2011), all of which are incorporated herein by reference in their entireties, as well as other specifications published by the NFC Forum. NFC is a short-range, wireless-connectivity technology that uses magnetic field induction to permit devices to share information with each other. NFC transceivers typically operate in the 13.56-MHz frequency spectrum and may transfer data at rates up to 848 kilobits/second. Communication between two NFC-capable devices occurs when they are brought into contact—or at least within sufficiently close physical proximity—of each other. Typical operational distance is between 0 and 4 centimeters, although the distance can be as great as 20 centimeters in some embodiments.

NFC devices may or may not include their own source of power. Some NFC devices (e.g., a mobile phone) may draw power from an integrated battery, while some NFC devices (e.g., an NFC-enabled kiosk) may draw power from an external power mains, e.g., via an AC-to-DC converter. Those NFC devices having a source of power that enables them to transmit NFC signals are commonly referred to as "active" devices, while those devices that do not include their own source of power are commonly known as "passive" devices or "tags." NFC tags utilize a magnetic field radiated by an active NFC device, such as an NFC reader, for power. Once the active NFC device is close enough to the NFC tag, the energy from the magnetic field powers the passive NFC tag so that it can establish an NFC communication link and communicate data with the active NFC device.

NFC transceiver 545 of FIG. 5A comprises an "active" transceiver circuit capable of communicating information and data with an external NFC-capable device such as a passive NFC tag. NFC interface 545 may include its own power supply, or draw power from a battery associated with device 500, such that it is capable of powering a passive NFC tag when brought into sufficient proximity. Once an NFC link is established, the NFC tag transmits information and/or data stored in its memory to NFC transceiver 545. However, NFC transceiver 545 is not limited to communicating information and data solely with passive NFC tags. In some embodiments, NFC transceiver 545 may be capable of operating in a "peer" mode with other external active NFC devices. Once the two devices are placed within sufficient physical proximity of each other, the data exchange between the two devices is bidirectional. In some embodiments, NFC transceiver 545 may be capable of operating in a "tag emulation" mode. In this mode, NFC transceiver 545 "sleeps" until it detects magnetic energy from another external NFC device such as an NFC reader, which triggers NFC transceiver 545 to "wake up" and operate like a programmable tag to communicate data to/from the external NFC device.

User interface 550 may take various forms depending on the particular embodiment of device 500. In some embodiments, device 500 is a mobile phone, in which case user interface 550 may comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In such mobile phone embodiments, the particular features comprising the device may depend on whether the device is a smartphone, feature phone, or other type of mobile phone. In other embodiments, device 500 is a tablet computing device (such as an iPad® sold by Apple, Inc.) comprising a touchscreen display that is much larger than touchscreen displays found on mobile phones. In such tablet embodiments, one or more of the mechanical features of user interface 550 may be replaced by comparable or functionally equivalent virtual user interface features (e.g., virtual keypad, virtual buttons, etc.) implemented using the touchscreen display of device 500, as familiar to persons of ordinary skill in the art. In other embodiments, device 500 may be a digital computing device, such as a laptop computer, desktop computer, workstation, etc. that comprises a mechanical keyboard that may be integrated, detached, or detachable depending on the particular embodiment.

In embodiments where device 500 comprises a touch screen display, the user may select a display element by touching an area on the touch screen display that corresponds to, relates to, or is associated with that display element. In these embodiments, the user may select an item from a single menu or hierarchical series of menus and/or sub-menus by dragging a finger along the screen area corresponding to the displayed menus then releasing it in the area corresponding to the final selection. Other ways of manipulating information in touch screen display embodiments will be apparent to persons of ordinary skill in the art.

In other embodiments of device 500, user interface 550 may comprise a non-touch screen display and one or more user input devices that are physically separate from the display, such as a keyboard, a mouse, a trackpad, a joystick, etc. In these embodiments, the user may select a display element, for example, by using the mouse to position a cursor over the desired element and clicking a button on the mouse to select the element, as known to persons of ordinary skill in the art. Similarly, the user may select an item from a single menu or hierarchical series of menus and/or sub-menus by dragging a finger along the screen area corresponding to the displayed menus then releasing it in the area corresponding to the final selection. Other ways of manipulating information in non-touch screen display embodiments will be apparent to persons of ordinary skill in the art.

In some embodiments, user interface 550 may comprise a speech recognition module that translates words or phrases spoken by the user into inputs and/or commands for device 500. Such embodiments may utilize the speaker of device 500 to provide a message, tone, etc. prompting the user for input, then utilize the microphone and associated circuitry to capture and digitize an audio signal comprising the user's speech. The audio signal then can be analyzed by speech recognition software executing on processor 510 to extract the user's inputs or commands contained therein. Finally, these inputs and/or commands can be sent to another application executing on device 500, e.g., as search term inputs for a search engine client application, or for selection of the display element corresponding to the user's speech.

In some embodiments, device 500 may comprise an orientation sensor, which can be used to sense when the user has changed the physical orientation of the device 500's display. An indication signal from the orientation sensor may be available to any application program executing on device 500, such that an application program may change the orientation of a screen display (e.g., from portrait to landscape) automatically when the indication signal shows a 90-degree change in physical orientation of the device. In this manner, the application program can maintain the screen display in a manner that is readable by the user, regardless of the physical orientation of the device.

Host interface 560 of device 500 also may take various forms depending on the particular embodiment of device 500. In embodiments where device 500 is a mobile phone, host interface 560 may comprise a USB interface, an HDMI interface, or the like. In some embodiments, device 500 may comprise more functionality than is shown in FIG. 5A. In some embodiments, device 500 may also comprise functionality such as a video and/or still-image camera, microphone, media player, etc. Moreover, radio transceiver 540 may include circuitry necessary to communicate using additional radio-frequency communication standards including Bluetooth, GPS, and/or others. Persons of ordinary skill in the art will recognize the above list of features and radio-frequency communication standards is merely exemplary and not limiting to the scope of the present disclosure. Accordingly, processor 510 may execute software code stored in program memory 520 to control such additional functionality.

The applications encoded in program memory 520 may include a telephone communication application 100, and/or appropriate systems adapted to drive operation of the user interface, and the session queuing component 24. As mentioned above, a telephone communication application may be adapted to signal, establish, and maintain an audio communication session (either as the session initiator or receiver) with remote endpoint devices over compatible networks (e.g., PSTNs, PLMNs, packet-based networks, etc.) utilized for audio communications. According to the diagram shown in FIG. 3B, the endpoint devices may include, for example, business communication center systems 14 for signaling, establishing, and maintaining audio communication sessions between each service agent 12 and the business clients, each of which may utilize one of the communication devices 11 for communication with the business.

Program memory 520 may further comprise a session queuing component 24. The session queuing component 24 may include a launch object rendered by processor 510 as an icon on the display screen comprising user interface 550. User selection of the icon associated with the launch object may cause device 500 to launch operation of the session queuing component 24.

Figure 5B:
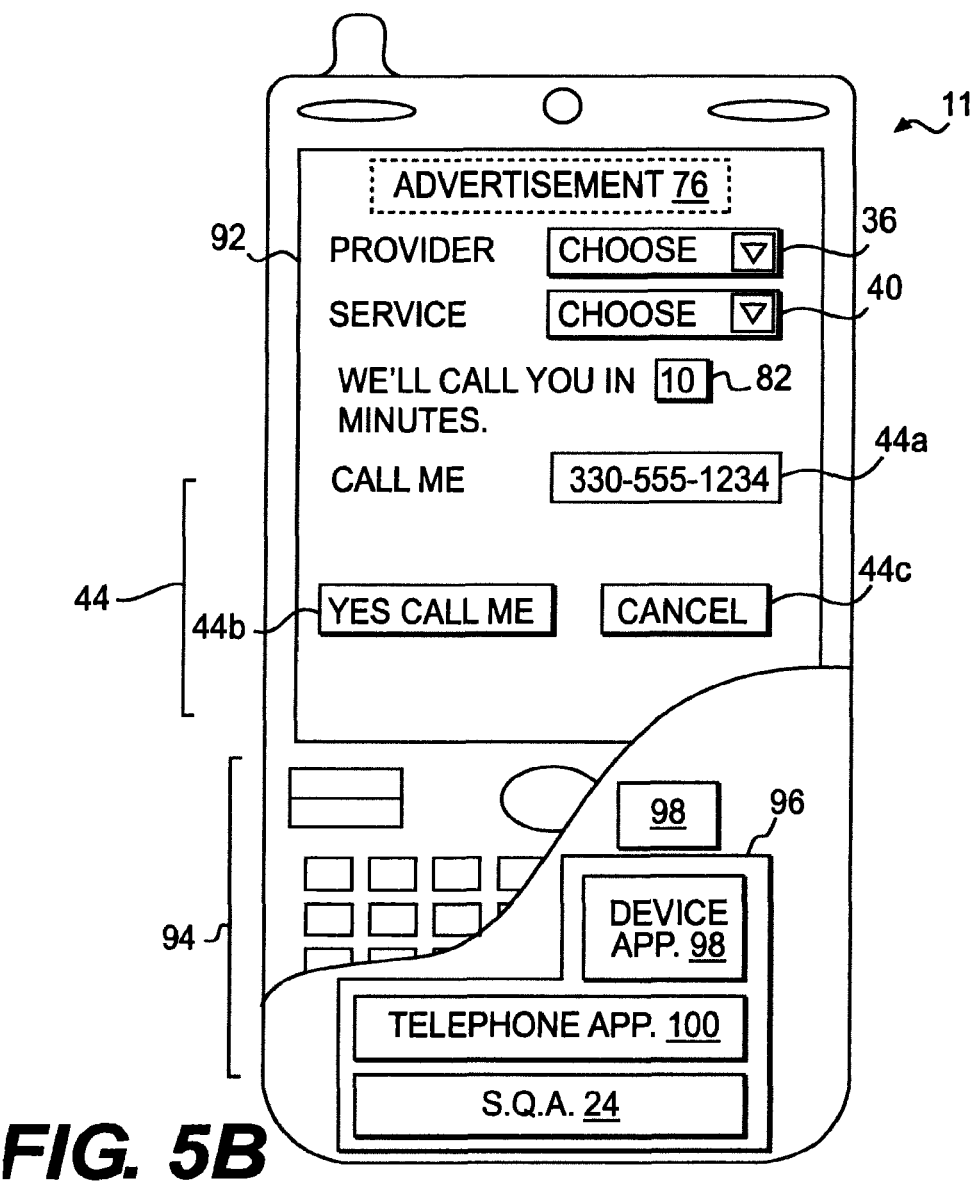
FIG. 5B is an exemplary communication device adapted for operation in accordance with an exemplary embodiment of the present disclosure.

Referring now to FIG. 5B, for purposes of performing the above described functions, visible objects of the session queuing component 24 (following activation by selection of the icon associated with the launch object) include a provider control 36, a service control 40, and a confirmation control 44. The confirmation control 44 may include a window 44a for confirming the identifier of a communication device 11 (i.e., the call back telephone number utilized to establish an inbound telephone call to the communication device 11 or other unique "call back" identifier used to establish an audio session with the communication device 11), an accept control object 44b and a cancel control object 44c.

In an exemplary embodiment, the telephone number of the communication device 11 may be pre-populated to the window object 44a with the window object being active to enable the user to modify the telephone number in the event he or she desires the call back to be to a communication receiving device that is different than communication device 11. The cancel control object 44c may be a selection button adapted to detect user selection. Upon detecting user selection, cancel control object 44c may be adapted to terminate operation of the session queuing component. The accept control object 44b may be a selection button adapted to launch the confirmation client 46 upon user selection. Upon launch of the session queuing component 24 the visible objects of the session queuing component 24 may be rendered on the display screen 92 as depicted in FIG. 5B.

The provider control 36 may be rendered in an active state with the group of providers 78 (FIG. 6) populated into its drop down menu. From this menu, the user may select providers from the selected business communication center. The service control 40 is shown in an active state. The service control 40 and the confirmation control 44 may be rendered in an inactive state (i.e., rendered with no populated data, inoperable, and rendered with a gray tint to indicate the inactive state). In an embodiment, the provider client 34 (shown in FIG. 3B) populates the provider control 36 with a listing of the providers from the group of providers 78.

Figure 6:
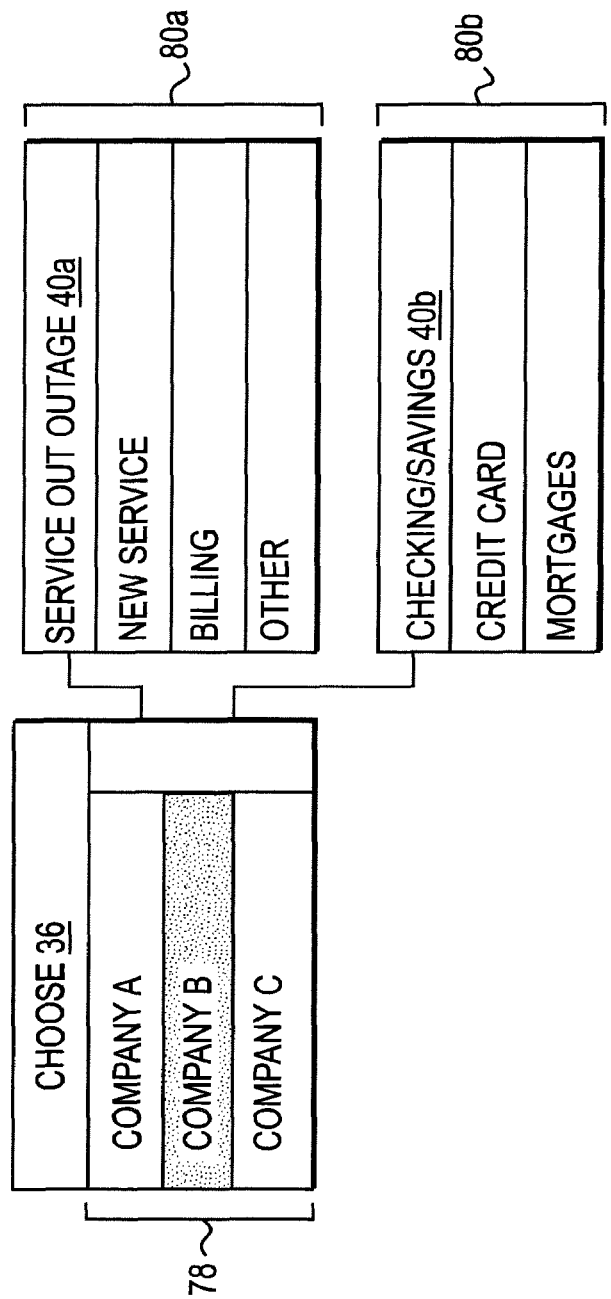
FIG. 6 is a table representing an exemplary provider control and an exemplary service control in accordance with an exemplary embodiment of the present disclosure.

Referring now to FIG. 6, shown is an illustration of the provider control 36. The provider control 36 may be a drop down menu control which displays a group of providers 78. From this menu, the user may select a provider from the selected business communication center.

The service control 40 may be a drop down menu control (as represented by 40a, 40b) which displays, for the selected provider, the services/queues of a group of services/queues 80a, 80b associated with the selected provider's business communication center. A user may select a service from this menu.

Exemplary providers include Company A and Company B. For purposes of illustration, Company A may be a utility company and its services/queues associated with its business communication center may include a service/queue for reporting loss of services, a service/queue for handling billing matters, and a default service/queue for handling other matters.

Company B, for illustration, may be a bank and its services/queues associated with its business communication center may include a service for handling of checking, savings, or other deposit accounts, a service for handling credit card accounts, a service for handling mortgage accounts, and a default service for handling other matters.

FIG. 7A shows an exemplary embodiment of a structure for communications or messages passing between the communication devices 11 and service providers. In this example, the structure of an active providers remote processing call 48 is shown. The structure may be an XML structure 100 with applicable SOAP or other remote processing call protocol information 102. The exemplary structure includes at least a method identifier 104, which identifies the active provider routine or process 26 as the remote process, and data arguments 106 for the active provider routine 26. The data arguments 106 may include at least identification of the user.

The remote processing call 48 may be encapsulated within appropriate TCP/IP and HTTP headers and other transport layer information 108 such as source IP address and source port number of the requesting device 11 and destination IP address and destination port number of the sequence component 22. Such combination may be encapsulated within appropriate media layer protocols 110 for transmission across physical communication media via various physical layer segments interconnecting the requesting device 11 and the sequence component 22.

Figure 7D:
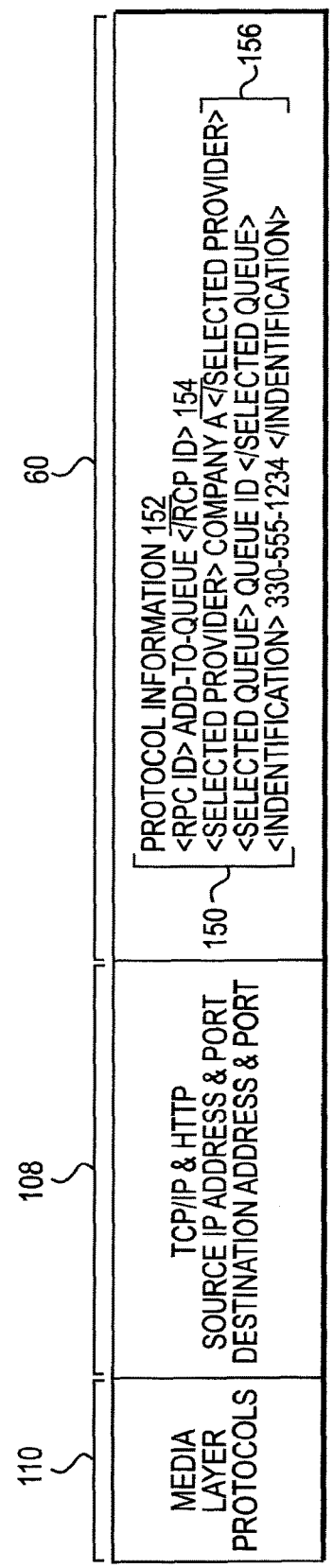

FIGS. 7B-7D show exemplary structures of other messages or communications within system 10 similar to that of active providers remote processing call 48. The other communications that may be similarly structured, encapsulated, and transported may include the active queue remote processing call 52 (FIG. 7B), expected wait time call 56 (FIG. 7C), add-to-queue remote processing call 154, the active providers message 50, the active queue message 54, the expected wait time message 58, and the confirmation remote processing call 60 (FIG. 7D), for example.

More specifically, referring to FIG. 8A and FIG. 8B, the active provider routine 26 includes a looking up (at step 112) in an active providers data store 200, a list of active providers associated with the user. The active providers data store 200 and may include a group of records 202, with each record associating a user ID 204 with identification of a group of active providers 202 associated with user ID 204. Step 114 represents building an active providers message 50 (shown in FIG. 3A) for return to the device generating the active providers remote processing call 48 (shown in FIG. 3A).

It should be appreciated that the above described structure and processes for populating the provider control 36 is exemplary only. Those skilled in the art will also recognize that the list of providers could be obtained and stored within the communication device 11. A list of providers stored within the communication device 11 may then be used for populating both the provider control 36 and the active queue control 40. Upon receiving a selection of a provider from the list of active providers 78 rendered or shown within the provider control, the service client routine 38 requests a listing of active queues from the active queue routine or process 28 of the sequence component 22. The service client routine 38 populates the service control 40 with a listing of active queues associated with the selected provider.

More specifically, referring to FIGS. 8C and 8D, the active queue routine or process 28 includes looking up (at step 126) in an active queues data store 208, a list of active queues associated with the selected provider. The active queues data store 208 may include a group of records 210, with each record associating a company ID 212 (identifying a provider) with identification of a group of active queues 214 associated with the company ID 212. The build active queues list (step 128) represents building an active queues message 54 (described above) for return to the device generating the active queue remote processing call 52 (described above). Upon receipt of the active queues message 54, by service client routine 38, the service control 40 is populated by the list of active queues 80a as discussed with respect to FIGS. 5B and 6.

It should be appreciated that the above described structure and processes for populating the service control 40 is exemplary only. Those skilled in the art will also recognize that lists of active queues for each provider could be obtained and stored within the communication device 11 utilizing one or more remote processing calls prior to user selection. As such, list of providers and active queues stored within the communication device 11 may then be used to populate both the provider control 36 and the active queue control 40. It is further envisioned that both the provider control 36 and the service control 40 may be combined within a single control listing combinations of a provider and a service.

More specifically, referring to FIG. 8E, the expected wait time routine or process 30 includes obtaining (at step 134) from the expected wait time component 18 associated with the selected queue of the selected provider, the expected wait time for the selected queue. Such step may include sending a remote processing call to the expected wait time component with data arguments (of the remote processing call) including identification of the selected queue. In some embodiments, the operations of steps 134 may comprise obtaining the number of clients currently waiting in the selected queue. The return expected wait time to calling device (step 136) represents the expected wait time component 18 building an expected wait time message 58. The expected wait time message can then be sent to the device generating the expected wait time remote processing call 56. In some embodiments, the operations of step 136 may comprise building and sending an expected wait time message comprising the number of clients currently waiting in the selected queue.

Referring back to FIG. 5B, upon receipt of the expected wait time response message 58, the expected wait time value 148 identifying the expected wait time duration of time is rendered on the display screen as depicted by reference numeral 82. In some embodiments (not shown), the number of clients currently waiting in the selected queue is rendered on the display screen. Following display of the identification of the duration of time (or the number of clients, as the case may be), the confirmation control 44 may be activated for obtaining user input.

As discussed, the confirmation control may include a window 44a for confirming a telephone number of the communication device 11 or the communication receiving device 50 (i.e., the telephone number utilized to establish an inbound telephone call to the communication device 11 or the communication receiving device 50), a confirmation control 44b and a cancel control 44c.

In an exemplary embodiment, the telephone number of the communication device 11 may be pre-populated to the window object 44a with the window object being active to enable the user to modify the telephone number in the event he or she desires the call back to be to a communication receiving device 50 that is different from communication device 11. The accept control object 44b may be a selection button adapted to launch the confirmation client 46 upon user selection. The cancel control 44c may be a selection button adapted to detect user selection. Upon detecting user selection, the cancel control object may be adapted to terminate operation of the session queuing component.

The confirmation client 46 (shown in FIG. 3A) may be adapted to send a confirmation remote processing call 60 to the sequence component 22 via the message structure described above. In this instance, the data arguments may include at least the identification of a telephone number or other telephone network address of the communication receiving device 50 or communication device 11 that the user desires for use in the connection to the service agent. Typically such identification will be a PSTN or PLMN telephone number that the provider systems will use as a "call back number" to establish a telephone connection between the user and a service agent at the appropriate call back time.

Further, the arguments of the confirmation remote processing call may include identification of the selected provider and selected queue which the user desires to join. Alternatively, the arguments may include a session ID matched to previous remote processing calls such that the sequence component may determine the selected provider and selected queue which the user desires to join.

More specifically, referring to FIG. 8F, the confirmation routine or process 32 includes (at step 216) generating an add-to-queue instruction 217. The instruction may include for example, a queue ID of the selected queue and the call back number (e.g., the telephone network identifier of the communication receiving device 50) in a format compatible for transmission to the selected business communication center's systems. The step 218 of passing the add-to-queue instruction 217 to the queue component 20 of the selected provider is shown in FIG. 8F. This step includes packaging the SOAP formatted add-to-queue instruction with applicable transport layer and media layer for transmission as discussed above. Upon receipt, the queue component 20 of the selected provider may add the user to the selected queue.

NFC tags may contain a wide variety of information, with the amount constrained only by the capacity of the particular tag. Currently, the NFC Forum has standardized four different tag formats, known as Types 1 through 4, respectively. Type-1 and Type-2 tags are based on ISO/IEC standard 14443 part A and are capable during operation of being read, written, and/or write-protected by a compatible NFC reader. A Type-1 Tag can hold at least 48 bytes of data while a Type-2 tag can hold at least 96 bytes of user data, although they are allowed to hold up to 2 kbytes. Type-3 tags are based on the Japanese Industrial Standard (JIS)×6319-4 while Type-4 tags are compatible with ISO/IEC 14443 parts A and B; both are manufactured to be either read-only or readable/re-writable. The data capacities of Type-3 and Type-4 tags are 1 Mbyte and 32 kbytes, respectively, although neither has a minimum data capacity. Unless otherwise specified, usage of the term "NFC tag" herein encompasses both a passive NFC tag and an active NFC device operating in tag emulation mode, as described above in more detail.

Various higher-layer communication protocols and message formats can be used for communication between an NFC tag and an NFC reader. For example, the NFC Forum has standardized the NFC Forum Data Exchange Format (NDEF), which is a lightweight, binary message encapsulation format that can be used to encapsulate one or more application-specific payloads of arbitrary type and size into a single message exchanged between two NFC devices, e.g., an NFC reader and an NFC tag. Each NDEF payload is accompanied and described by type, length, and (optional) identifier parameters. Payload types include, for example, absolute Universal Resource Identifiers (URIs), such as defined in RFC3986; Multipurpose Internet Mail Extension (MIME) media types, such as defined in RFC2046 (e.g., "image/jpeg"); NFC-specific types; and NFC-external types, which can be defined according to the needs of a specific application. For example, a payload comprising an eXtensible Markup Language (XML) document according to RFC3023 may be indicated by a payload type of "application/xml; charset="utf-16". An NDEF message contains one or more NDEF records, each of which may carry a payload of arbitrary type. Within an NDEF message, the records may be placed in either a flat (called "association by reference") or a hierarchical (called "association by containment") arrangement in accordance with the NFC RTD Specification.

When two NFC-capable devices are brought into sufficient proximity to each other, an NDEF message may be transmitted across an NFC radio link from the source device to the destination device. Subsequently, two different scenarios may occur at the destination device. In the case where the source is an NFC tag and the destination is an NFC reader, the destination device will parse or deconstruct the NDEF message and pass the various NDEF payload(s) contained therein to one or more user application(s), activating such applications as necessary. In the case where the source is an NFC reader and the destination an NFC tag, the NDEF message may be written to the NFC tag provided that the tag memory is write-enabled.

Further information regarding NDEF, RTDs, and other aspects of exchanging information between two NFC-capable devices (e.g., an NFC tag and an NFC reader) is available in the NFC specifications incorporated herein by reference, as well as others published by the NFC Forum or other relevant standards organizations. The person of ordinary skill will understand that an NFC tag can contain nearly any type of information usable with respect to embodiments of the present disclosure. Moreover, the person of ordinary skill will understand that an application can understandably read the information contained within an NFC tag via a compatible NFC reader, e.g., an NFC tag and reader compliant with the same NFC Forum specifications.

An embodiment of a system and method for managing, directing, and queuing communication events captures information from an NFC tag associated with an item using an NFC reader, e.g., an NFC reader contained within a mobile device. The information in the NFC tag can be any type of identifying information associated with the item or its provider, e.g., one or more universal resource identifiers (URIs) of web pages, one or more documents comprising web pages, one or more phone numbers and/or queue identifiers, one or more actions, one or more messages, or a combination of any of the above, depending on the embodiment. The captured information is used to determine potential queues and/or phone numbers the user may wish to use. This can be done in various ways depending on the embodiment. In some embodiments, determining may involve retrieving a web page comprising information related to the queues and/or phone numbers. The web page may be stored on the NFC tag or on a remote server.

In some embodiments, determining may comprise retrieving the phone numbers and/or queue identifiers from the NFC tag. In some embodiments, determining may comprise executing one or more actions read from the NFC tag. The determined phone numbers may correspond to a contact center associated with the item, at which the individuals, groups or divisions may be subject-matter experts, or those who have knowledge for answering questions or providing information or assistance to customers or requestors. These individuals, groups, or divisions may be arranged in one or more queues, which may be further subdivided according to the particular type of service or assistance provided (e.g., sales, billing, repair scheduling, etc.).

Generally, the method using call-back information has several steps, for example it may include two or more of the following steps: (a) capture information from an NFC tag; (b) determine one or more phone numbers, queues, or sets of queues based on the captured information; (c) present the phone numbers or queues to a user who initiated capturing the information; (d) receive a selection of one or more presented queues or phone numbers; (e) display estimated wait time; (f) request a call back or schedule a call back; and (g) initiate a callback. The method can be used with a variety of hardware configurations including communication devices with NFC readers.

Embodiments of the system and method for managing, directing, and queuing communication events eliminate the need to find and dial a phone number associated with a product, service, provider, organization, etc. when one is not readily available. When the need arises, a user can simply capture information from an NFC tag associated with an item using an NFC reader, e.g., an NFC reader contained within a mobile device. The information in the NFC tag can be any type of identifying information associated with the item or its provider, e.g., one or more documents comprising web pages, one or more URIs of web pages stored on a remote server, one or more phone numbers and/or queue identifiers, one or more actions, one or more messages, or a combination of any of the above, depending on the embodiment. One or more phone numbers, queues, or sets of queues may be determined based on the captured information, a callback may be initiated, and the parties connected.

Figure 9A:
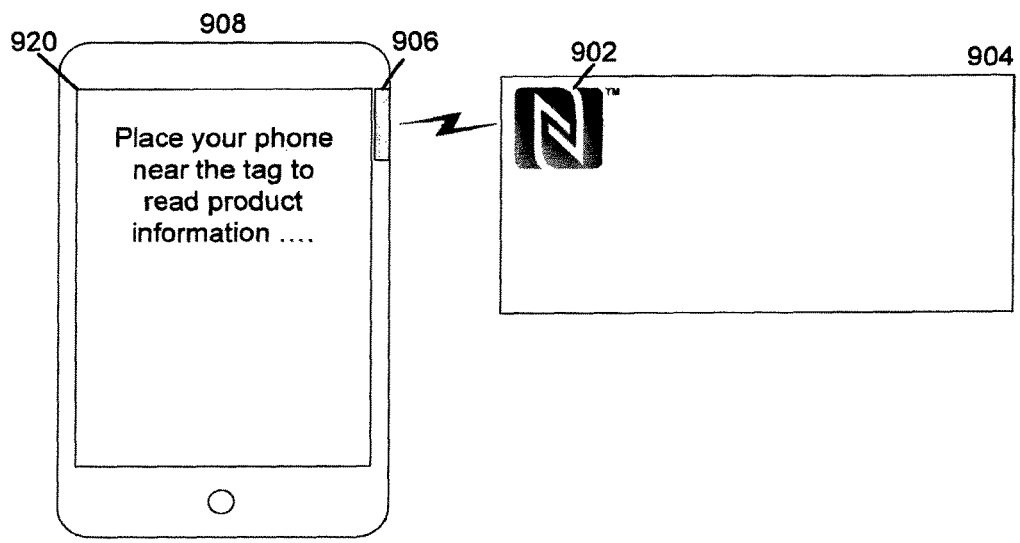
FIG. 9A is a diagram showing a communication device reading the contents of an NFC tag, according to embodiments of the present disclosure.

FIG. 9A illustrates an embodiment of the system for managing, directing, and queuing communication events that uses an NFC reader 906 to capture information from an NFC tag 902 affixed to or contained within item 904. In some embodiments, NFC tag 902 may be affixed to or contained within a product such as a refrigerator, dishwasher, dryer, computer, TV, DVD player, set-top box, media server, etc. such that it is visible, apparent, and/or accessible to the user. For example, the stylized "N-Mark" (a trademark of the NFC Forum) may be printed or inscribed on NFC tag 902 or on the surface of item 904 above the location of NFC tag 902 contained within. In other embodiments, NFC tag 902 may be affixed to or contained within a product's shipping container or other product packaging materials. In other embodiments, NFC tag 902 may be affixed to or contained within a publication associated with a product, service, provider, or organization. In some embodiments, the publication may be a business card of an individual or organizational unit (e.g., customer service)

associated with a provider or organization. In other embodiments, the publication may be a membership card, a credit or debit card, an affinity card, or other type of card associated with a provider or organization.

One skilled in the art will appreciate that NFC reader 906 can be part of any type of communication device 908, such as a mobile communication device, a stationary scanner device, a handheld scanning device, or a kiosk. Various configurations of NFC readers are known to persons of ordinary skill in the art. The user may cause NFC reader 906 of communication device 908 to come in contact with or in sufficiently close proximity to NFC tag 902 (e.g., by moving NFC reader 906 and/or NFC tag 902) so as to energize NFC tag 902 for communicating the information contained therein to communication device 908, which may display such information to the user in various forms. This information may comprise various information about item 904 (e.g., model number, serial number, etc.) and/or the provider or organization associated with item 904 (e.g., manufacturer name, retailer name/location, etc.). The information captured from NFC tag 902 may also comprise or relate to various available queues, divisions, or individual contacts.

In some embodiments, the information captured from NFC tag 902 may be used to render a display on communication device 908. In some embodiments, the information comprises a URI from which a web page can be retrieved prior to rendering. The URI may be a universal resource locator (URL) or a universal resource name (URN), as known by persons of ordinary skill in the art. The URI may refer to a resource stored at a remote location (e.g., a remote web server), to a resource stored in the NFC tag, or to a resource stored in the device itself. The information may further comprise metadata related to the URI, such as a title, actions, etc. In some embodiments, the information comprises a document (e.g., an HTML, XHTML, or XML document) that can be used to render an information display, either by itself or in combination with other information (e.g., a form) stored on the device or captured from NFC tag 902. In other embodiments, the information may comprise phone numbers and information identifying queues (e.g., "Sales", "Repairs") associated with the phone numbers. In some embodiments, the phone number may comprise a URI. These various types of information captured from NFC tag 902 may be used by an application (e.g., session queuing component 24 stored in program memory 520 of device 500, as described above with reference to FIG. 5A) to render a display of information related to an item, provider, or organization including, for example, call-back information.

Figure 9B:
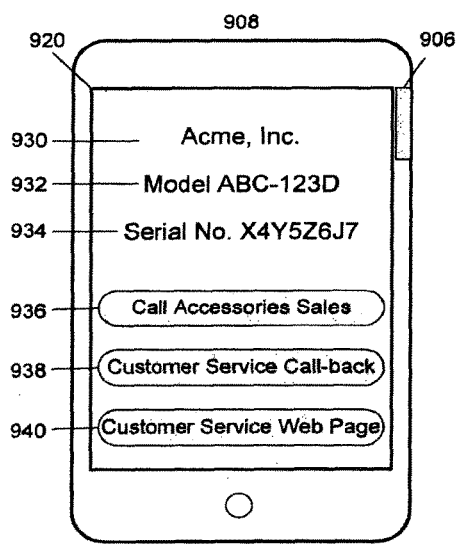
FIG. 9B is a diagram of a communication device displaying information associated with one or more active queues, according to embodiments of the present disclosure.

An exemplary page of information rendered on display 920 of communication device 908 based on information captured from NFC tag 902 is shown in FIG. 9B. In this example, item 904 is a product and the exemplary web page comprises provider identifier 930 (e.g., company name), product or service type identifier 932 (e.g., model name or number), and optional item identifier 934 (e.g., product serial number) fields. The information displayed in fields 930, 932, and 934 may be captured from NFC tag 902. In addition, the exemplary page comprises user-selectable action controls 936, 938, and 940. If selected by the user, action control 936 causes communication device 908 to place a telephone call to a phone number associated with the "Accessory Sales" organization of the provider of item 904. Similarly, selection of action control 940 by the user causes the communication device 908 to access the provider's customer service web page and render that web page in display 920.

If action control 938 is selected by the user, this will cause the communication device 908 to submit a request for a call-back from the "Customer Service" organization of the provider of item 904. The request may be submitted by an application executing on device 908 (e.g., session queuing component 24) and, in some embodiments, may comprise an identifier associated with device 908, such as a phone number or network address. In some embodiments, the application may automatically read the identifier from a known storage location (e.g., phone number from the subscriber identity module) or by using known methods associated with an interface (e.g., an application programming interface). In other embodiments (not shown), the application may prompt the user to enter a device identifier for the call-back, which will then be included in the request. In other embodiments, the request does not include an identifier.

Figure 9C:
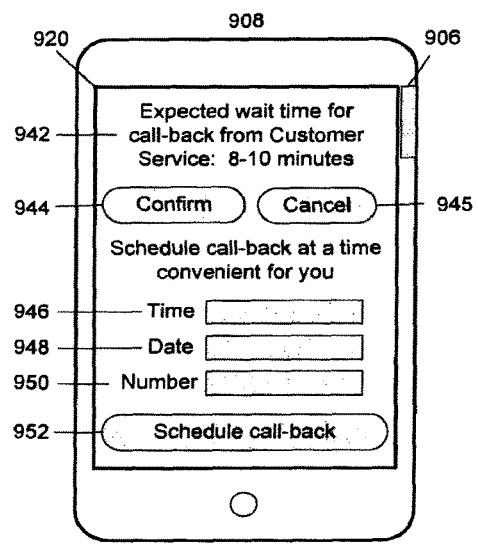
FIG. 9C is a diagram of a communication device displaying the wait information for a selected queue and a prompt for user selection of one of a plurality of actions, according to embodiments of the present disclosure.

Upon receiving the call-back request, the system for managing, directing, and queuing communication events for the provider's "Customer Service" organization determines wait information for the call-back, and sends a response to communication device 908 comprising the wait information. In some embodiments, an application executing in communication device 908 displays an indication of the wait information to the user on display 920. In some embodiments, the application prompts the user to confirm the call-back and, if the user does so, sends a confirmation message to the system. An exemplary display comprising these and other elements is shown in FIG. 9C. Display 920 of device 908 comprises a wait notification 942 and a confirmation action button 944 that, if selected by the user, will cause the application to send a call-back confirmation message to the system. The user may also select the cancel action button 945, which will cause the application to send a cancellation message to the system. Alternately, the user may schedule a call-back at a preferred time and date by entering appropriate values in time entry field 946 and date entry field 948, respectively. In some embodiments, user selection of time entry field 946 may cause the application to display a plurality of times (e.g., 15-minute increments during the business day) from which the user may select the preferred time. In some embodiments, user selection of date entry field 948 may cause the application to display a plurality of dates (e.g., in a monthly calendar format) from which the user may select the preferred date for the scheduled call-back.

In some embodiments, the user may enter a phone number to be used for the scheduled call-back in number entry field 950. In case the user leaves field 950 blank, the application may assume that the user wishes to be called back at the number associated with device 908. After entering such information, the user may select schedule action button 952, which causes the application to send a scheduled call-back request comprising such information to the system. In the event that the user leaves number field 950 blank, the application may automatically include an identifier associated with device 908 in the scheduled call-back request, in the manner discussed above with reference to FIG. 9B.

In some embodiments, the exemplary display of FIG. 9C will be shown to a user only if the indication value comprising the wait notification 942 is greater than or equal to a predetermined duration. Otherwise, an alternate display may be shown to the user. For example, if the indication value comprises an expected wait time, the display of FIG. 9C may be shown to a user only if the expected wait time is greater than or equal to two (2) minutes. If the expected wait time is less than two (2) minutes, the exemplary display of FIG. 9D may be shown to the user. Here exemplary display 920 of device 908 comprises a wait notification 960 and a direct connection action button 962 (e.g., "Connect now") that, if selected by the user, will cause the application to attempt to establish an immediate telephone connection with the system. The user may also select the cancel action button 945, which will cause the application to send a cancellation message to the system. Alternately, the user may schedule a call-back at a preferred time and date in the same manner as shown in and described above in reference to FIG. 9C. Depending on the embodiment, display 920 may comprise various combinations of action buttons 944, 945, 952, and 962 and entry fields 946, 948, and 950, including all of the above.

After the expected wait time (or an approximately equivalent time) has elapsed—or the waiting clients have been served, as the case may be—the system places an outgoing call to communication device 908. Alternatively, an embodiment of the system places an outgoing call to another communication receiving device (not shown) having a phone number provided by the user, e.g., in the call-back request. One skilled in the art will appreciate that the expected wait time may be very brief, substantially zero, or less than a predetermined threshold, in which case a call may be placed immediately, connecting the user to a person or group of people eligible to provide information or answer questions. In such cases, an immediate call may be placed based on user input, such as described above with reference to FIG. 9D, or automatically without user intervention.

Figure 9D:
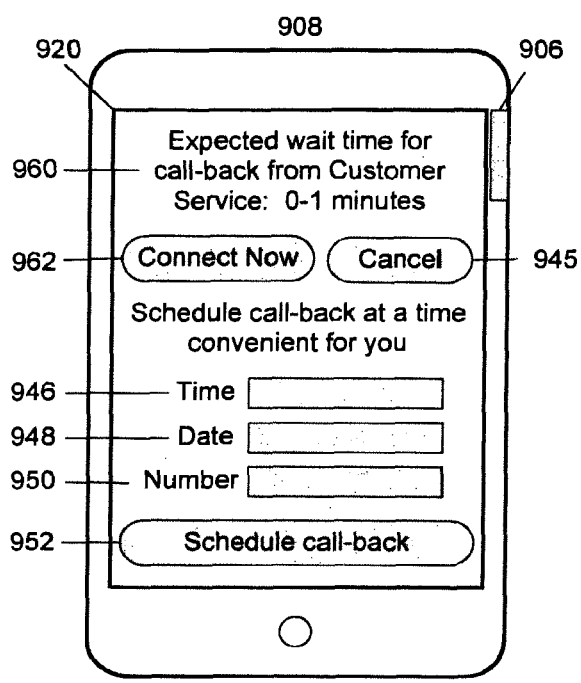
FIG. 9D is a diagram of a communication device displaying wait information for a selected queue and a prompt for user selection of one of a plurality of actions, according to other embodiments of the present disclosure.

In some embodiments, the displays of FIGS. 9C and 9D may comprise an indication of the number of clients waiting in the selected queue. In other words, wait notifications 942 (shown in FIG. 9C) and 960 (shown in FIG. 9D) may comprise the number of clients waiting in the selected queue instead of—or in addition to—the expected wait times shown in the figures. These embodiments may otherwise have the same functionality as described above, including presenting a display similar to display 920 in FIG. 9C when the number of waiting clients is greater than or equal to a predetermined value, and presenting a display similar to display 920 in FIG. 9D when the number of waiting clients is less than a predetermined value.

Embodiments of the system and method for managing, directing, and queuing communication events eliminate the need for a user to research, locate and find a specialist of a company to provide information or to answer questions regarding a product. When a question about a product or service arises, a user can simply capture information from an NFC tag that is located in a store, on a brochure, on a coupon, or on an actual product, and initiate a callback from a specialist who can answer questions, provide information, or complete an order to be shipped. A specialist or other resource may be in any location including for example, a contact center, in the same store, or in a different store. Thus, a purchaser can obtain information about a particular product he is contemplating on purchasing while viewing a product at a store.

As described above, in some embodiments, information captured from an NFC tag affixed to or contained within a card may be used to locate one or more available queues suitable for a user. The information comprising the NFC tag on or in the card may be associated either directly or indirectly to queues or groups of resources. In other words the card may be associated directly to queues or with particular people or a business group of people. Those people or groups of people typically correspond to or are related to available queues. In some embodiments queues may be created and populated de novo for each specific information-based request, depending on business rules established by a company. Virtually any type of card may be used with the system including for example, plastic, paper, magnetic, metal cards and the like, credit cards, store cards, VIP cards, money cards, gift cards, point cards, award cards, library card, cards associated with products or devices such as a doll's ID card or an automobile card, and cards associated with services.

As discussed above, an NFC reader may be used to capture information from the NFC tag affixed to or contained within the card. In some embodiments, at least a portion of the captured information may be sent to a central location which relates it to one or more queues or groups of resources. Information about queues or groups may be sent to the user. In other embodiments, the information captured from the NFC tag comprises information about the queues or groups. In either case, a session queuing component displays the associated queues to the user. Estimated wait time information may or may not be made available to the user. Using this queue information, the user is able to select a desired queue or queues. A callback or scheduled call can then be arranged. As with the other embodiments, the card reader may be portable, handheld or stationary. Various types of card readers and card combinations may be used.

Figure 10:
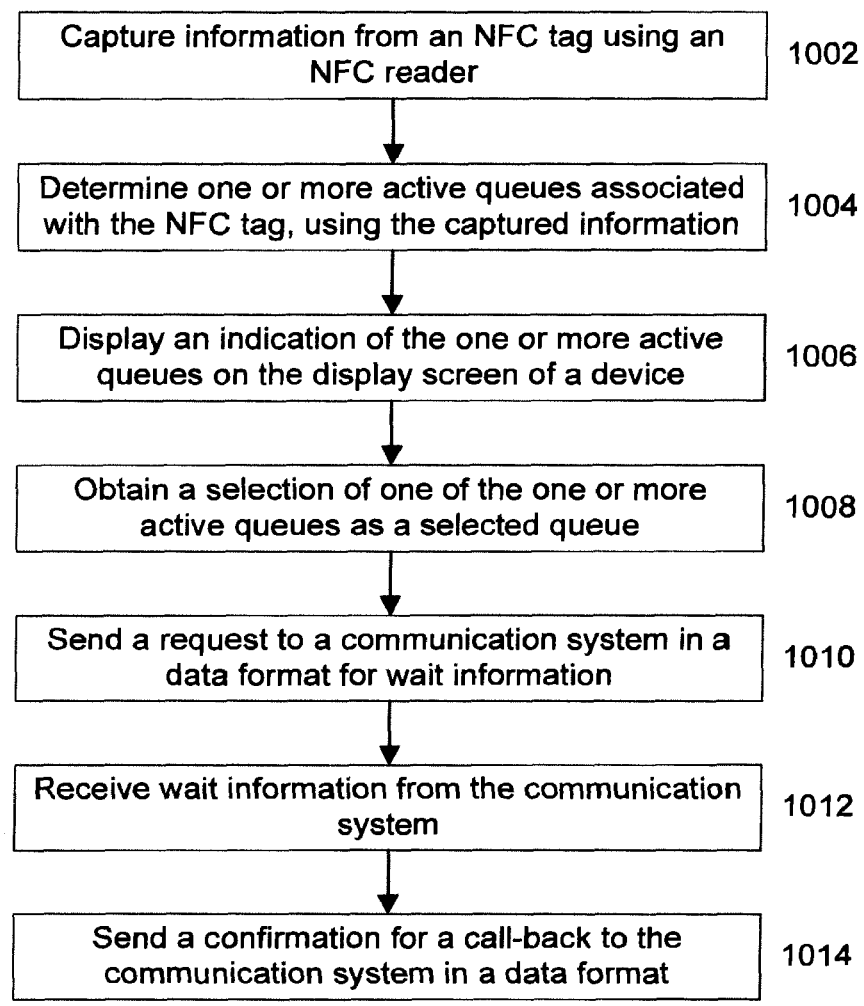
FIG. 10 is a flow chart illustrating an embodiment of a method for initiating a call-back sequence using NFC technology.

FIG. 10 is a flow chart illustrating an embodiment of a method 1000 for initiating a call-back sequence using NFC technology. In some embodiments, the operations of method 1000 may be performed by an application executing on the processor of a communication device (e.g., session queuing component 24 stored in program memory 520 of device 500, as described above with reference to FIG. 5A). At block 1002, information is captured from an NFC tag using an NFC reader. The NFC reader may be integrated within the communication device, connected to the communication device via a physical (e.g., wired) or wireless connection, or simply interoperate with the communication device. In block 1004, the captured information is used to determine one or more persons, queues, and/or phone numbers associated with an item that the NFC tag is affixed to or contained within, the provider of the item or a related service, or an organization affiliated with the item in some way.

The operation of block 1004 can be performed in various ways depending on the embodiment. In some embodiments, the operation may involve retrieving and/or parsing a document (e.g., an HTML, XHTML, or XML document) that can be used to render a display page comprising information related to the persons, queues, and/or phone numbers. In some embodiments, the entire document may be stored on, and retrieved from, the NFC tag in block 1002. In some embodiments, the document may be retrieved from a resource specified by a URI that is captured from the NFC tag in block 1002. In some embodiments, the captured URI may be combined with other information captured in block 1002 to form a combined URI. For example, a provider identifier, a model identifier, an item identifier, a base URI, and an action may be captured from the NFC tag in block 1002. Subsequently, in block 1004, the base URI is combined with the provider, model, and item identifiers according to the action to form a combined URI. The resource specified by the combined URI is then accessed as a database query, which returns a document (e.g., HTML document).

In some embodiments, the operation of block 1004 may comprise combining certain information captured from the NFC tag in block 1002, retrieving other information from another resource specified by a URI that is captured from the NFC tag in block 1002, and combining the captured and retrieved information. For example, a provider identifier, a model identifier, an item identifier, and a form URI may be captured from the NFC tag in block 1002. Subsequently, in block 1004, the form URI is accessed to retrieve a form (e.g., an HTML or XML form), then combined with the provider, model, and item identifiers to create a document (e.g., HTML or XML document) that can be used to render a display page.

In other embodiments, the operation of block 1004 may comprise combining certain information captured from the NFC tag in block 1002 with other information stored on the communication device associated with the NFC reader. For example, the information captured in block 1002 may comprise phone numbers and information identifying queues (e.g., "Sales", "Repairs") associated with the phone numbers. In some embodiments, the phone number may comprise a URI. The information stored on the communication device may be a form (e.g., an HTML or XML form), which may be associated with an application. The application may combine the captured information and the form to create a document that can be used to render a display page.

In block 1006, an application displays identification of the one or more active queues on a display screen of the communication device. The application may comprise a session queuing component that resides within the communication device. Next, in block 1008, an application obtains a selection (e.g., from a user) of one of the one or more active queues as a selected queue. The application may comprise a session queuing component that resides within the communication device. In block 1010, a request for wait information for the selected queue is sent to the communication system in a data format. In block 1012, wait information is received from the communication system. In block 1014, a call-back confirmation is sent to the communication system in a data format.

The above described system represents an exemplary embodiment of a connection system for sequencing communication device identifiers in a selected queue for connection to a service agent of a group of service agents at a business communication center. The present disclosure includes all such equivalents and modifications, and is limited only by the scope of the following claims.

The invention claimed is:

1. A communication server system for initiating a call-back to a communication receiving device based on information stored in an NFC tag, the system comprising:
   a search component that receives from a mobile communication device a queue identifier captured from an NFC tag using an NFC reader located remotely from the search component, determines a list of active queues corresponding to the queue identifier from the NFC tag, and sends an identification of active queues taken from the determined list of active queues to the mobile communication device for display;
   a sequence component that receives from the mobile communication device an indication of a selected queue from the list of active queues, confirms a call-back to the mobile communication device, and initiates a call-back sequence to the communication receiving device;
   a queue component having more than one queue and adapted to assign a placeholder in the selected queue for an identifier associated with the communication receiving device;
   a call-back component for placing an outgoing call to the communication receiving device, in response to a prompt received from the sequence component; and
   wherein the search component uses both the queue identifier and the identifier to determine the list of active queues.

2. The system of claim 1 wherein the information captured from the NFC tag comprises a Universal Resource Identifier.

3. The system of claim 1 wherein the information captured from the NFC tag comprises an action.

4. The system of claim 1 further comprising means for estimating a wait time for a queue.

5. A method for initiating a call-back to a communication receiving device based on information stored in an NFC tag, the method comprising:
   receiving, at a server, from a mobile communication device a queue identifier captured from an NFC tag using an NFC reader;
   determining a list of active queues corresponding to the queue identifier from the NFC tag;
   sending information about the determined list of active queues to the mobile communication device;
   receiving, from the mobile communication device, an indication of a selected queue from the determined list of active queues;
   assigning a placeholder for an identifier in the selected queue, wherein the identifier is associated with a communication receiving device;
   if a call back request is received from the mobile communication device, initiating a call back to the communication receiving device based upon the assigned placeholder in the selected queue; and
   wherein the step of determining comprises use of both the captured queue identifier from the NFC tag and the identifier to determine the list of active queues.

6. The method of claim 5 wherein the steps of determining and sending are performed by the server.

7. The method of claim 5 wherein the steps of receiving an indication, assigning and initiating are performed at a call center.

8. The method of claim 5 wherein the mobile communication device comprises an NFC reader.

9. The method of claim 5 wherein the communication receiving device is a smartphone.

10. The method of claim 5 wherein the mobile communication device and the communication receiving device comprise a single device.

11. The method of claim 5 wherein the step of receiving further comprises receiving a Universal Resource Identifier originating from the NFC tag.

12. The method of claim 5 wherein the step of receiving further comprises receiving a message originating from the NFC tag.

13. The method of claim 5 wherein the step of receiving further comprises receiving information captured from the NFC tag comprising an action.

14. The method of claim 5 further comprising estimating a wait time for a selected queue and communicating the expected wait time to the mobile communications device.

15. A non-transitory, computer-readable medium comprising instructions for initiating a call-back to a communication receiving device based on information stored on an NFC tag, the instructions when executed cause a computerized communication system to:

receive, from a remotely located mobile device, information read from an NFC tag comprising a queue identifier:
determine queues corresponding to the queue identifier from the NFC tag;
send identifications of the determined queues to the remotely located mobile device;
receive, from the remotely located mobile device, an indication of a selected queue from the determined queues;
assigning a placeholder for an identifier in the selected queue, wherein the identifier is associated with a communication receiving device;
receive, from the mobile device, a call back request; and
initiating a call back to the communication receiving device based upon the assigned placeholder in the selected queue; and
wherein determining queues comprises use of both the queue identifier from the NFC tag and the identifier.

16. The non-transitory computer readable medium of claim 15, wherein the mobile device and the communications receiving device are the same device.

17. The non-transitory computer readable medium of claim 15, wherein the information received from the NFC tag includes a Universal Resource Locator.

18. The non-transitory computer-readable medium of claim 15, wherein when executed the instructions further cause the system to determine the queues from the identifier.

19. The non-transitory computer-readable medium of claim 15, wherein when executed the instructions further cause the system to estimate a wait time of the placeholder in the selected queue and communicate the wait time for the selected queue.

* * * * *